United States Patent
Yun et al.

(10) Patent No.: US 11,773,117 B2
(45) Date of Patent: *Oct. 3, 2023

(54) COMPOUND FOR ENHANCING ADHESION PROPERTIES OF POLYIMIDE RESIN AND POLYIMIDE COPOLYMER PRODUCED USING SAME

(71) Applicant: LG CHEM, LTD., Seoul (KR)

(72) Inventors: Cheolmin Yun, Daejeon (KR); Kyungjun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 840 days.

This patent is subject to a terminal disclaimer.

(21) Appl. No.: 16/492,012

(22) PCT Filed: Jun. 27, 2018

(86) PCT No.: PCT/KR2018/007267
§ 371 (c)(1),
(2) Date: Sep. 6, 2019

(87) PCT Pub. No.: WO2019/066203
PCT Pub. Date: Apr. 4, 2019

(65) Prior Publication Data
US 2020/0010679 A1 Jan. 9, 2020

(30) Foreign Application Priority Data

Sep. 28, 2017 (KR) .................. 10-2017-0125671
Jun. 25, 2018 (KR) .................. 10-2018-0072773

(51) Int. Cl.
*C07F 7/18* (2006.01)
*C08G 73/10* (2006.01)
(Continued)

(52) U.S. Cl.
CPC .......... *C07F 7/1804* (2013.01); *C08G 73/106* (2013.01); *C08L 79/08* (2013.01); *C08L 2203/16* (2013.01)

(58) Field of Classification Search
None
See application file for complete search history.

(56) References Cited

U.S. PATENT DOCUMENTS 4,923,948 A 5/1990 Matsuki et al.
5,061,809 A 10/1991 Angus, Jr. et al.
(Continued)

FOREIGN PATENT DOCUMENTS

CN 104968709 A 10/2015
CN 107001681 A 8/2017
(Continued)

OTHER PUBLICATIONS

International Search Report issued for International Application No. PCT/KR2018/007267 dated Oct. 17, 2018, 2 pages.
(Continued)

*Primary Examiner* — Randy P Gulakowski
*Assistant Examiner* — Ha S Nguyen
(74) *Attorney, Agent, or Firm* — ROTHWELL, FIGG, ERNST & MANBECK, P.C.

(57) ABSTRACT

The present invention provides a novel polyimide resin adhesion enhancer having a fluorene framework, wherein a polyimide film produced using same exhibits conventional properties such as heat resistance and mechanical properties, and maintains adhesion with a carrier substrate while not being affected with respect to retardation even during a high-temperature process.

13 Claims, 3 Drawing Sheets

(51) Int. Cl.
- *C08L 79/08* (2006.01)
- *C09D 179/08* (2006.01)
- *C08J 5/18* (2006.01)
- *C08K 5/544* (2006.01)
- *C08K 5/5455* (2006.01)

(56) References Cited

U.S. PATENT DOCUMENTS

| | | |
|---|---|---|
| 7,625,596 B2 | 12/2009 | Lewis et al. |
| 9,777,137 B2 | 10/2017 | Fujii et al. |
| 2012/0168075 A1 | 7/2012 | Abys et al. |
| 2015/0158980 A1 | 6/2015 | Oka et al. |
| 2015/0368402 A1 | 12/2015 | Akinaga et al. |
| 2018/0093461 A1 | 4/2018 | Utashiro et al. |

FOREIGN PATENT DOCUMENTS

| | | | |
|---|---|---|---|
| EP | 3392293 A1 | | 10/2018 |
| JP | 2009-256293 A | | 11/2009 |
| JP | 2009256293 A | * | 11/2009 |
| JP | 2009-298995 A | | 12/2009 |
| KR | 10-2006-0067810 A | | 6/2006 |
| KR | 10-2010-0128335 A | | 12/2010 |
| KR | 10-2014-0144529 A | | 12/2014 |
| KR | 10-2014-0144530 A | | 12/2014 |
| KR | 10-2016-0097685 A | | 8/2016 |
| KR | 10-2017-0057458 A | | 5/2017 |
| TW | I542610 B | | 7/2016 |
| TW | 201629123 A | | 8/2016 |
| TW | I583721 B | | 5/2017 |
| TW | 201803917 A | | 2/2018 |
| WO | 2016-167296 A1 | | 10/2016 |
| WO | 2018-021747 A1 | | 2/2018 |

OTHER PUBLICATIONS

European Search Report issued for European Patent Application No. 18862503.2 dated Jun. 23, 2020, 12 pages.

Yamada et al., "Fluorene-containing silicon compounds with high refractive index and transparency, their manufacture, their films, polymerizable compositions, and cured products", (Jan. 1, 2009), pp. 1-6, XP055643239.

Office Action issued for European Patent Application No. 18862503.2 dated Feb. 1, 2021, 5 pages.

* cited by examiner

[Fig. 1]
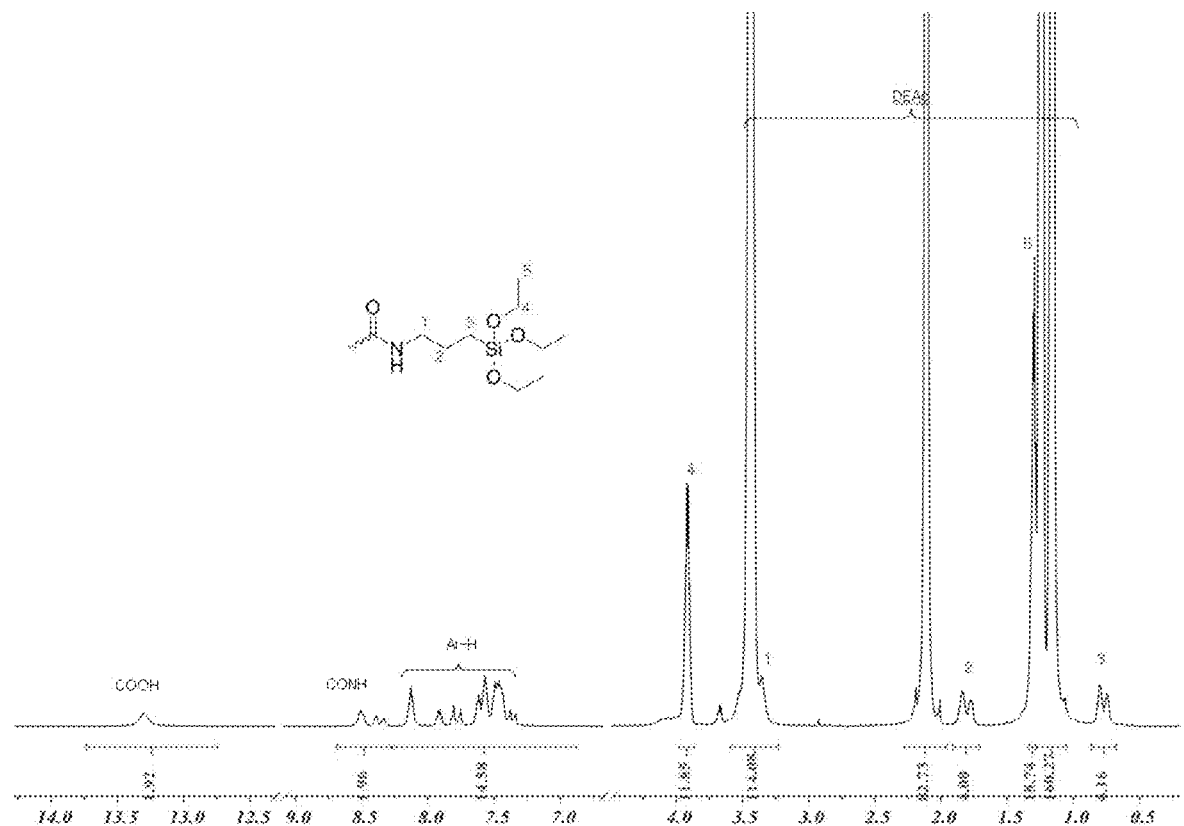

[Fig. 2]
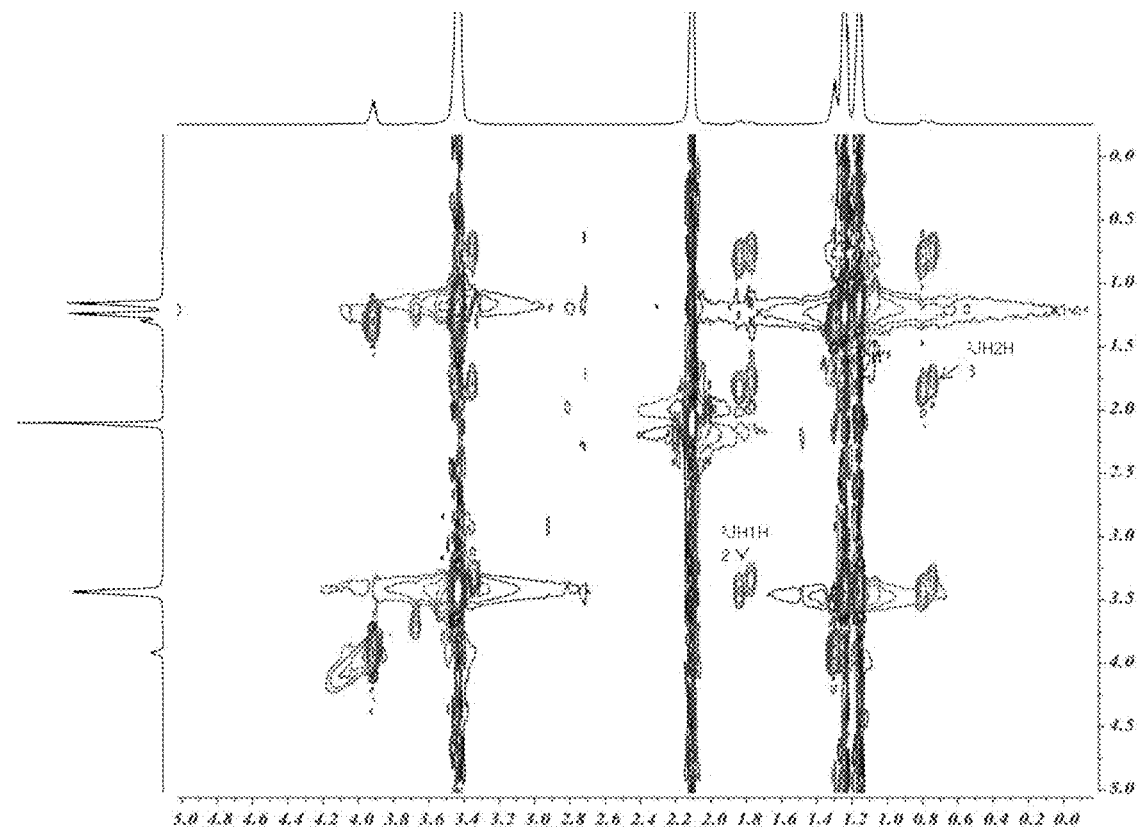

[Fig. 3]
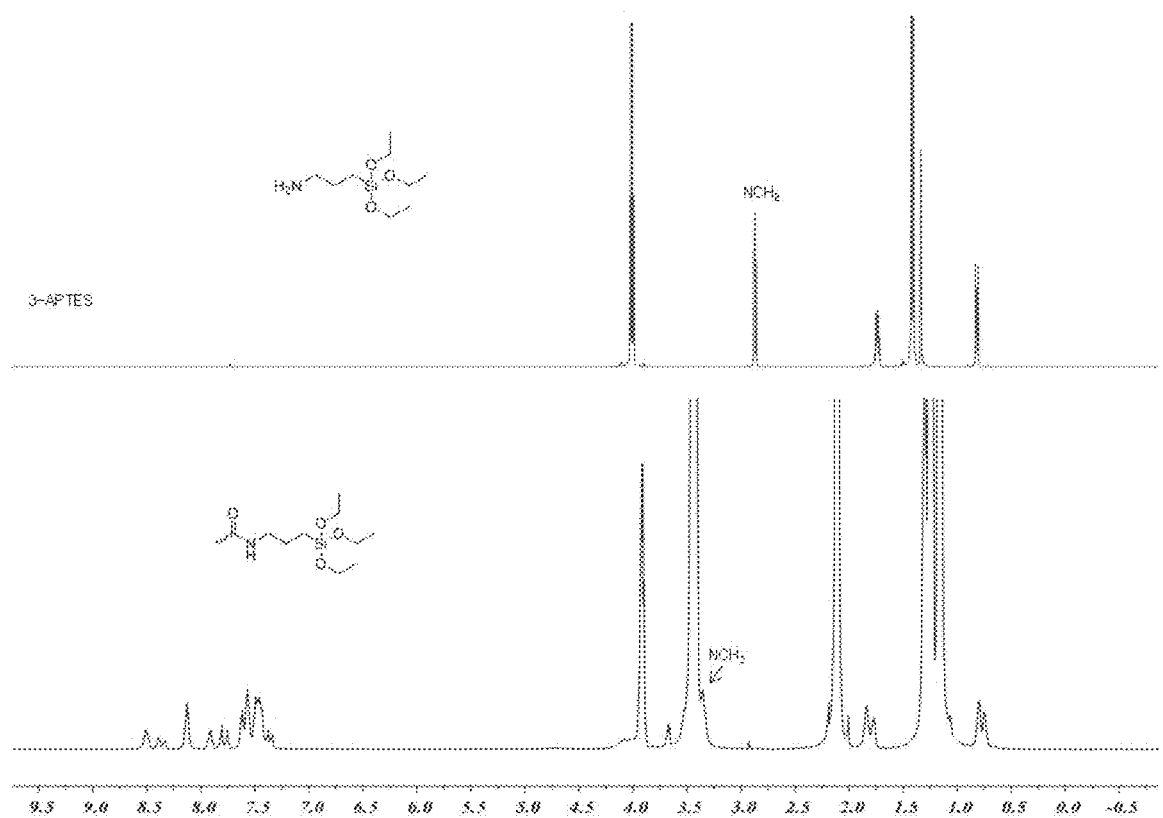

COMPOUND FOR ENHANCING ADHESION PROPERTIES OF POLYIMIDE RESIN AND POLYIMIDE COPOLYMER PRODUCED USING SAME

BACKGROUND OF THE INVENTION

1. Field of the Invention

This application is a 35 U.S.C. § 371 National Phase Entry Application from PCT/KR2018/007267, filed on Jun. 27, 2018, and designating the United States, which claims the benefit of priority to Korean Patent Application Nos. 10-2017-0125671, filed on Sep. 28, 2017 and 10-2018-0072773, filed on Jun. 25, 2018, the entire disclosures of which are incorporated herein by reference.

The present invention relates to a novel compound capable of improving adhesiveness of a polyimide resin and a polyimide copolymer prepared using same.

2. Description of the Related Art

In recent years, weight reduction and miniaturization of products have been emphasized in the field of display. However, a glass substrate is heavy and brittle and is difficult to be applied to a continuous process. Accordingly, researches are actively carried out for replacing glass substrates with plastic substrates having advantages of being light, flexible, and capable of continuous processing in devices such as cellular phones, notebook computers, PDAs, and the like.

In particular, polyimide (PI) resin has advantages that it is easy to synthesize, and it can be made in the form of a thin film and does not require a crosslinking group for curing. For these reasons, many researches have tried to use the PI in a flexible plastic display board having light and flexible properties as a material for integration in semiconductors of LCDs, PDPs and the like according to the trends of recent electronic products, such as lightweight and refinement.

A polyimide (PI) film, which is produced by forming a film with the polyimide resin, is generally prepared by solution polymerization of an aromatic dianhydride and an aromatic diamine or an aromatic diisocyanate to prepare a solution of polyamic acid derivative, coating the solution on a silicon wafer or a glass, and curing by heat treatment.

In order to prepare a circuit board, a semiconductor substrate, a flexible display substrate, etc. by using a polyimide resin, it is necessary to have excellent adhesion to a silicon wafer, a glass or a metal, in addition to physical properties such as heat and oxidation resistance, heat resistance, radiation resistance, low temperature resistance, chemical resistance, etc.

Generally, an adhesion promoter such as a silane compound is used to improve adhesive force between a polyimide film and a glass or metal surface. When the adhesion promoter is applied to the surface to improve adhesive force, it acts as a foreign substance. As a result, a smooth surface of the substrate may not be obtained. Further, a coating process should be repeated one more time after an application process, which is not economically efficient.

When the adhesion promoter is directly added to a polyamic acid, problems caused by the application process can be minimized. However, an amino group of a silane compound may react with a carboxylic group of polyamic acid to generate a salt, so that foreign substances may be formed on the substrate.

Therefore, there is a need for developing of an adhesive promoter for polyimide resin which enables to improve productivity and efficiency of process by omitting a step for giving adhesive force to the polyimide resin, and to remarkably improve the surface adhesion, while ensuring excellent mechanical properties without deteriorating appearance characteristics of final products.

SUMMARY OF THE INVENTION

A problem to be solved by the present invention is to provide a novel compound useful as an adhesion promoter for a polyimide resin.

The present invention also provides a polyimide copolymer containing the novel compound as an adhesion promoter for a polyimide resin.

The present invention also provides a polyimide film prepared using the polyimide copolymer.

In order to solve a problem of the present invention, there is provided a compound having a structure represented by the following Formula (1a) or (1b).

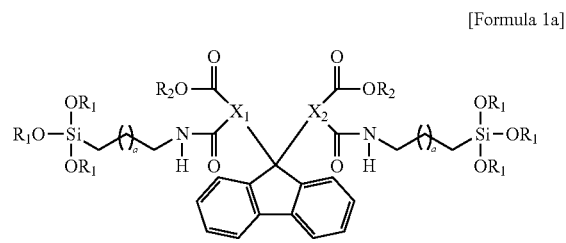

[Formula 1a]

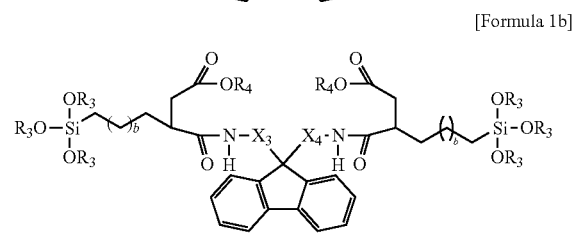

[Formula 1b]

In the Formulas (1a) and (1b), $X_1$ and $X_2$ are each independently a substituted or unsubstituted trivalent organic group having 1 to 30 carbon atoms, or are each independently a substituted or unsubstituted tetravalent organic group having 3 to 30 carbon atoms such that $X_1$ and $X_2$ are bonded to each other, $X_3$ and $X_4$ are each independently a substituted or unsubstituted divalent organic group having 1 to 30 carbon atoms, or are each independently a substituted or unsubstituted trivalent organic group having 3 to 30 carbon atoms such that $X_3$ and $X_4$ are bonded to each other, $R_1$ and $R_3$ are each independently an alkyl group having 1 to 5 carbon atoms, $R_2$ and $R_4$ are each independently a hydrogen atom or an alkyl group having 1 to 5 carbon atoms, and a and b are each independently an integer of 1 to 3.

According to one embodiment, the compound of Formula (1a) or (1b) may be a compound of Formula (2a) or (2b).

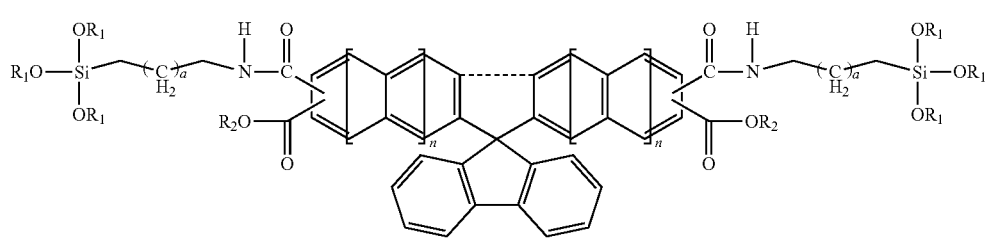
[Formula 2a]

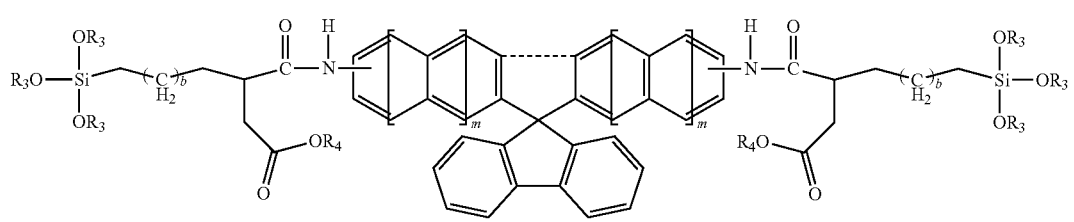
[Formula 2b]

In the Formulas (2a) and (2b),
$R_1$ and $R_3$ are each independently an alkyl group having 1 to 5 carbon atoms,
$R_2$ and $R_4$ are each independently a hydrogen atom or an alkyl group having 1 to 5 carbon atoms,
a and b are each independently an integer of 1 to 3,
n and m are each independently an integer of 0 to 3, and
a dotted line (-----) indicates a bond or a non-bond.

According to one embodiment, the compound of formula (2a) may be selected from compounds of following Formulas (3a) to (3f).

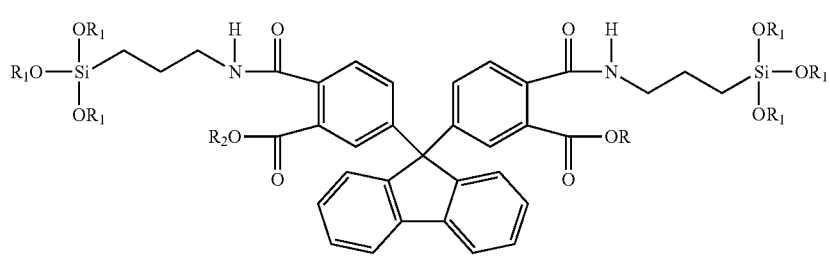
(3a)

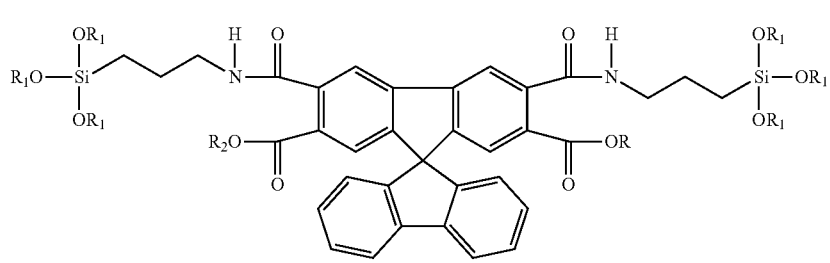
(3b)

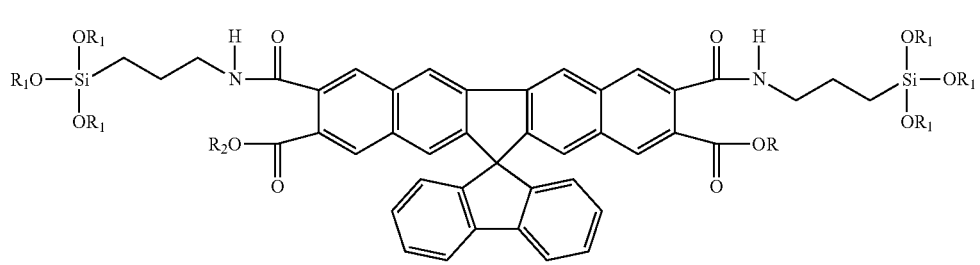
(3c)

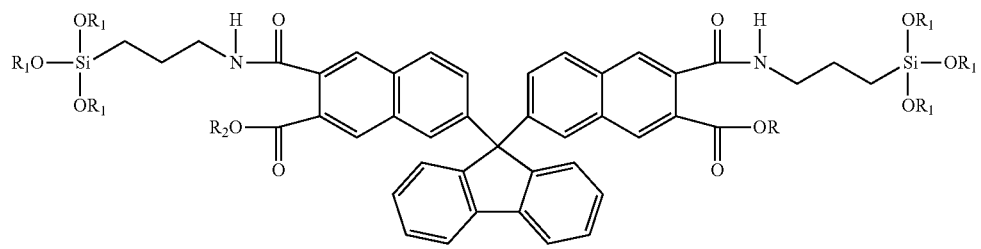
(3d)
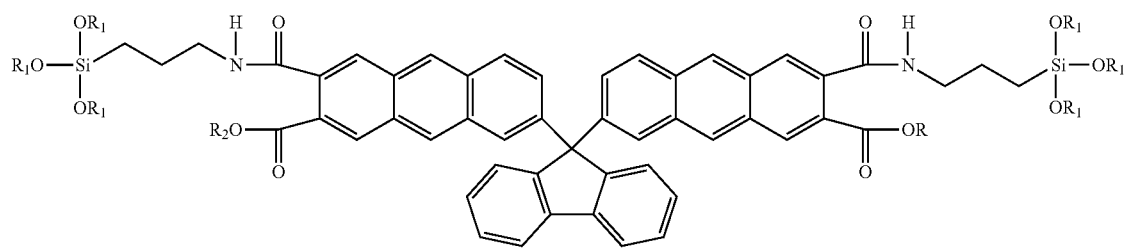
(3e)
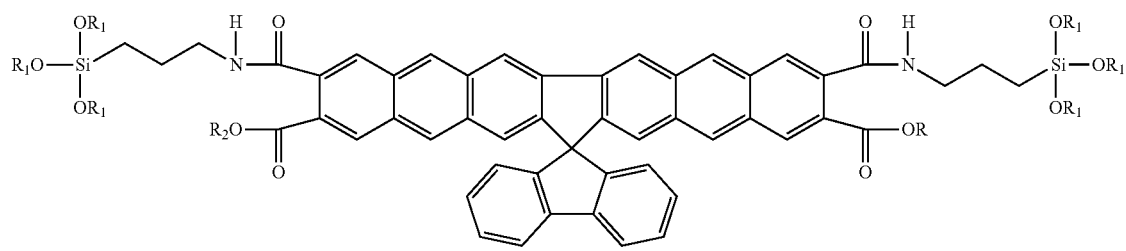
(3f)
According to one embodiment, the compound of Formula (2b) may be selected from compounds of the following Formulas (4a) to (4f).
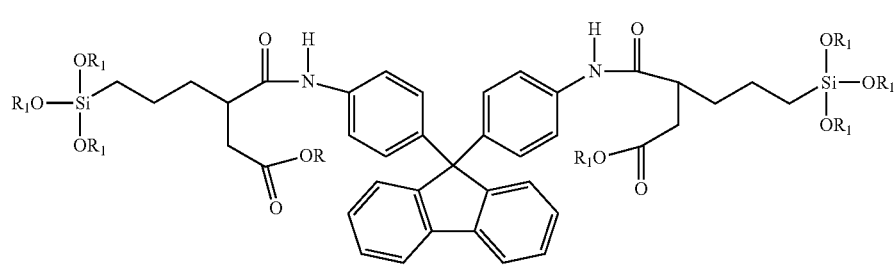
(4a)
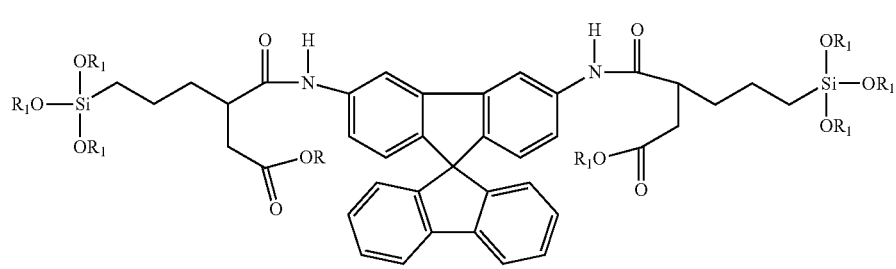
(4b)

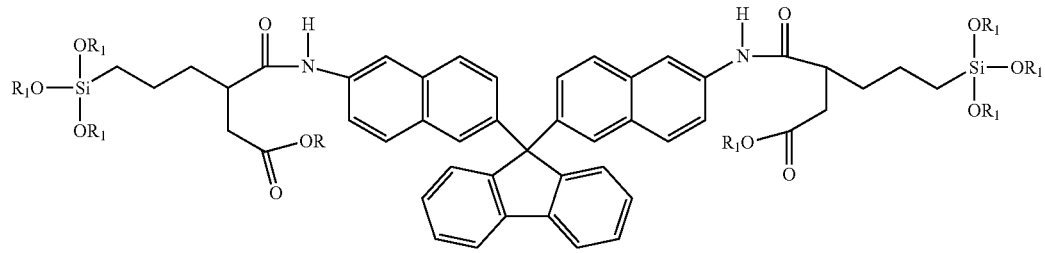

(4c)

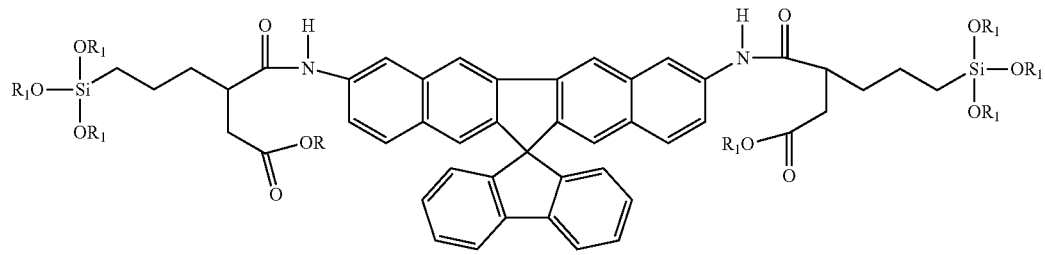

(4d)

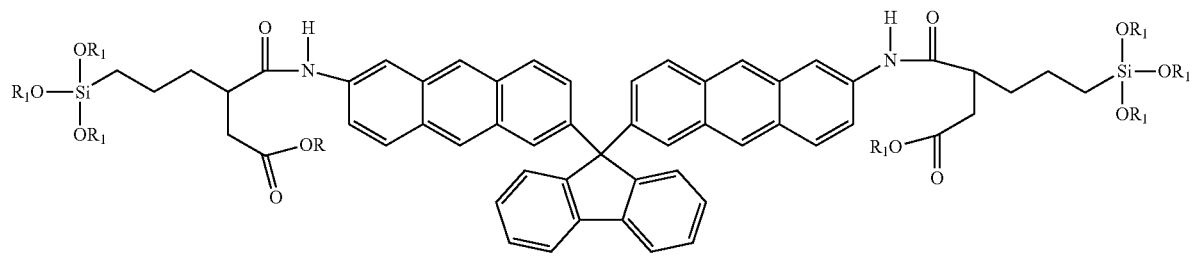

(4e)

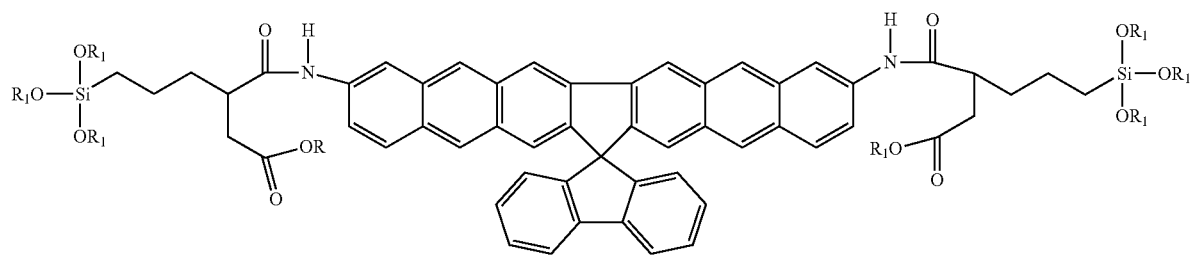

(4f)

In order to solve other problems of the present invention, there is provided a polyimide copolymer prepared by polymerizing and curing a polyimide precursor composition comprising:

an acid dianhydride, a diamine and a dimethylsiloxane (DMS)-diphenylsiloxane (DPS) oligomer, as polymerization components;

a solvent having a positive partition coefficient (Log P) at 25° C.; and a compound of Formula (1a) or (1b).

According to one embodiment, the domain of the DMS-DPS oligomer at a size of 50 nm or less is uniformly distributed in a matrix of the polyimide, and the volume occupied by the DMS-DPS domain may be 15 to 30% by volume of the total volume.

According to one embodiment, a size of the DMS-DPS domain may be from 1 nm to 50 nm.

According to one embodiment, the DMS-DPS oligomer may have the following structure:

[Formula 6]

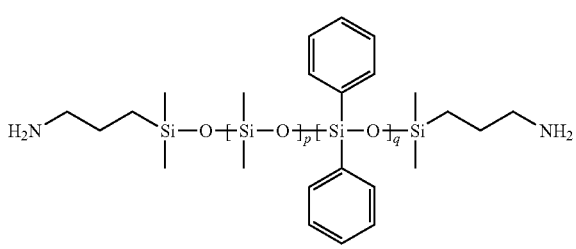

wherein, p and q are molar fractions, and when p+q=100, p is 70 to 90 and q is 10 to 30.

According to one embodiment, the adhesion promoter for a polyimide resin is contained in an amount of 0.1 to 10 parts by weight relative to 100 parts by weight of the polyimide precursor composition.

According to one embodiment, the adhesion promoter for a polyimide resin is contained in an amount of 0.001 to 0.5 mole per mole of the acid dianhydride.

According to one embodiment, a molecular weight of the DMS-DPS oligomer having the structure of Formula (6) may be 4000 g/mol or more.

According to one embodiment, the solvent having a positive distribution coefficient (Log P) may be an amide-based solvent.

According to one embodiment, the amide-based solvent may be at least one selected from the group consisting of dimethylpropionamide (DMPA), diethylpropionamide (DEPA), N,N-diethylacetamide (DEAc), N,N-diethylformamide (DEF), and N-ethylpyrrolidone (NEP).

The present invention also provides a polyimide film produced from the polyimide copolymer.

According to one embodiment, the retardation of the polyimide film may be −500 to 500 nm.

According to one embodiment, the adhesive force between the polyimide film and a carrier substrate may be at least 5 gf/in.

EFFECT OF THE INVENTION

The present invention provides a novel adhesion promoter for a polyimide resin having a fluorene skeleton, whereby the polyimide copolymer containing the adhesion promoter does not exhibit an increase in retardation, while maintaining excellent existing properties such as heat resistance and mechanical properties and adhesion properties to a carrier substrate even in a high-temperature process.

BRIEF DESCRIPTION OF THE DRAWINGS

FIG. 1 is a $^1H$ NMR spectrum of the compound prepared in Synthesis Example 1.

FIG. 2 is a $^1H$-$^1H$ TOCSY (Total Correlation Spectroscopy) spectrum of the compound according to Synthesis Example 1.

FIG. 3 shows a comparison of the $^1H$ NMR spectrums of APTES (3-aminopropyltriethoxysilane) and the compound according to Synthesis Example 1.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

In the present disclosure, all compounds or organic groups may be substituted or unsubstituted, unless otherwise specified. Herein, the term "substituted" means that at least one hydrogen contained in the compound or the organic group is substituted with a substituent selected from the group consisting of a halogen atom, an alkyl group having 1 to 10 carbon atoms, a halogenated alkyl group, a cycloalkyl group having 3 to 30 carbon atoms, an aryl group having 6 to 30 carbon atoms, a hydroxyl group, an alkoxy group having 1 to 10 carbon atoms, a carboxylic group, an aldehyde group, an epoxy group, a cyano group, a nitro group, an amino group, a sulfonic group or a derivative thereof.

The present invention provides a compound having a structure represented by the following Formula (1a) or (1b).

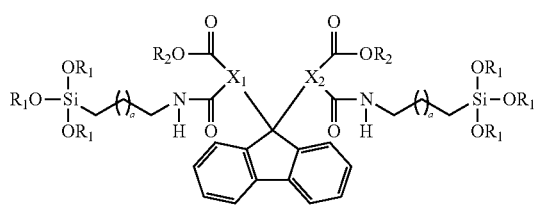

[Formula 1a]

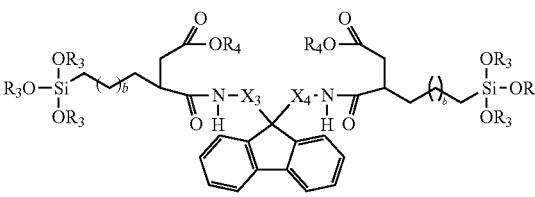

[Formula 1b]

In the Formulas (1a) and (1b), $X_1$ and $X_2$ are each independently a substituted or unsubstituted trivalent organic group having 1 to 30 carbon atoms, or are each independently a substituted or unsubstituted tetravalent organic group having 3 to 30 carbon atoms such that $X_1$ and $X_2$ are bonded to each other, $X_3$ and $X_4$ are each independently a substituted or unsubstituted divalent organic group having 1 to 30 carbon atoms, or are each independently a substituted or unsubstituted trivalent organic group having 3 to 30 carbon atoms such that $X_3$ and $X_4$ are bonded to each other, $R_1$ and $R_3$ are each independently an alkyl group having 1 to 5 carbon atoms, $R_2$ and $R_4$ are each independently a hydrogen atom or an alkyl group having 1 to 5 carbon atoms, and a and b are each independently an integer of 1 to 3.

According to the preferred embodiment, it may be a compound having a structure represented by Formula (2a) or (2b).

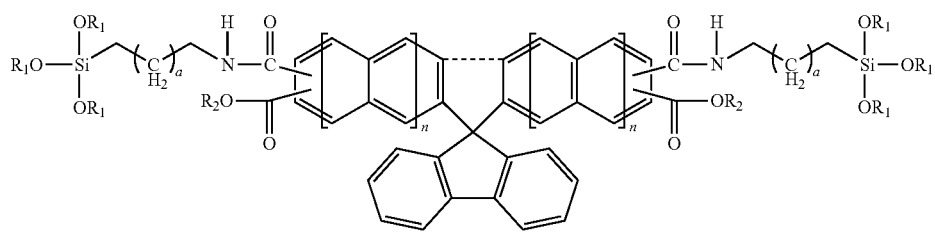

[Formula 2a]

-continued

[Formula 2b]

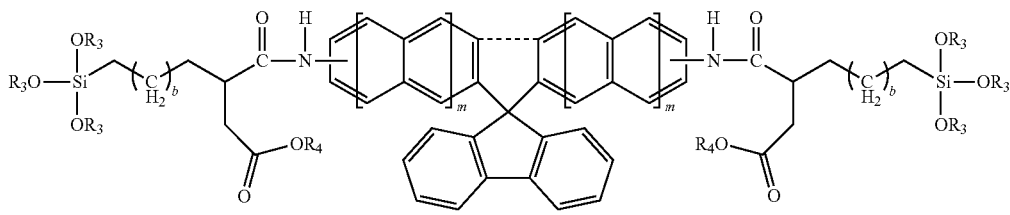

$R_1$, $R_2$, $R_3$, $R_4$, a, b, n and m are the same as defined above, and a dotted line (------) indicates a bond or a non-bond.

As for high heat resistant polyimide used as a conventional flexible display substrate, there has been used a method of applying an adhesion promoter to a glass as a carrier substrate or a glass substrate on which an inorganic layer is deposited in order to improve the adhesion to the glass and then film-forming. However, such a conventional adhesion promoter has a problem in that foreign substances are generated from application of the adhesion promoter, or an additional coating process is required, thereby having a low economic efficiency. In addition, even when an adhesion promoter is directly added to the polyimide precursor, the amino group reacts with the carboxylic group of polyamic acid to form a salt, resulting in reduction of adhesiveness.

There is also a conventional method in which the adhesion promoter can be directly added to the polyimide precursor to improve adhesiveness. However, there is an increase in the retardation value in the thickness direction. Therefore, in spite of the increase in adhesion property, there is a problem that the physical properties of the resulting polyimide film may be affected. This is because that the adhesion promoter of the prior art is produced from dianhydride which generally comprises two or more aromatic structures, which results in a phase retardation phenomenon due to a relatively rigid structure at this portion after curing.

Alternatively, when an adhesion promoter containing a flexible structure such as ODPA (4,4'-oxydiphthalic anhydride) is used, the retardation value may not be increased due to the flexibility of the structure, but the Tg tends to be lowered.

Thus, a study was made by the present inventors on the adhesion promoter which does not salt out when mixed with a polyimide precursor, so that the generation of foreign substances can be minimized and the adhesion to the substrate is excellent, and which does not influence on the retardation value in the thickness direction that is an optical property of the polyimide film prepared by application and curing.

The compound which can be used as an adhesion promoter according to the present invention has a fluorene skeleton such as a structure of Formula (1a) or (1b), so that an intermolecular free volume is generated due to the fluorene skeleton and a packing density is not affected, while maintaining the effect of adhesion enhancement to the maximum. Further, the compound can provide a high heat-resistant polyimide film which does not affect the heat resistance and the retardation value in the thickness direction that is an optical property of the polyimide film due to the structural characteristic including more aromatics.

An adhesion promoter having the structure of Formula (1a) can be prepared from the reaction of an acid dianhydride containing a fluorene structure with aminopropyltetraethoxysilane.

An adhesion promoter having the structure of Formula (1b) can be prepared from the reaction of a diamine containing a fluorene structure with anhydride-terminated tetraethoxysilane.

In particular, in the compound of Formula (1a) or (1b), the alkoxysilane (Si—OR) moiety can be converted into a silanol group (Si—OH) by water or moisture. The silanol group can undergo a condensation reaction with glass or metal, so that it can bind strongly to a glass or metal surface.

According to one embodiment, the compound of Formula (1a) may be selected from compounds of the following Formulas (3a) to (3f).

[Formula 2a]

(3a)

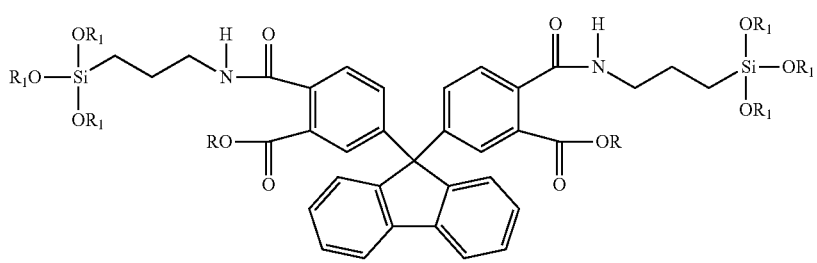

(3b)

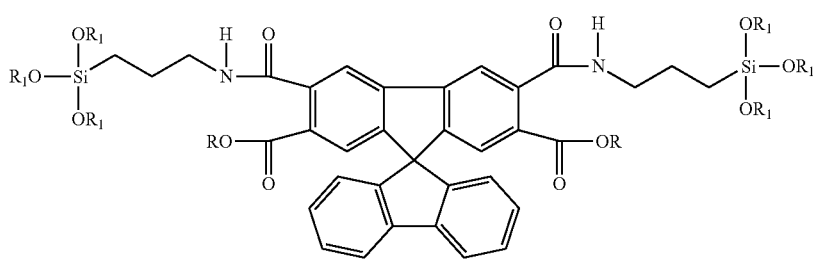

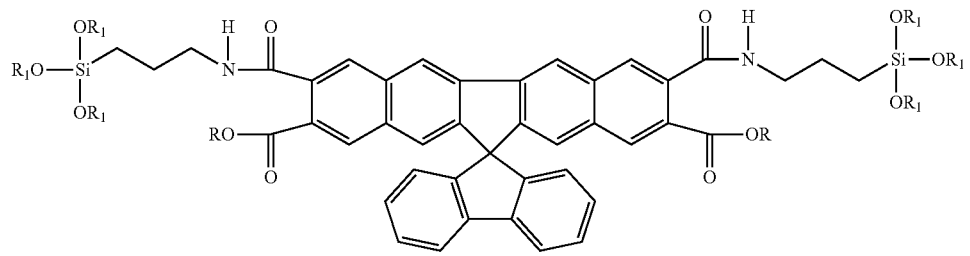
(3c)
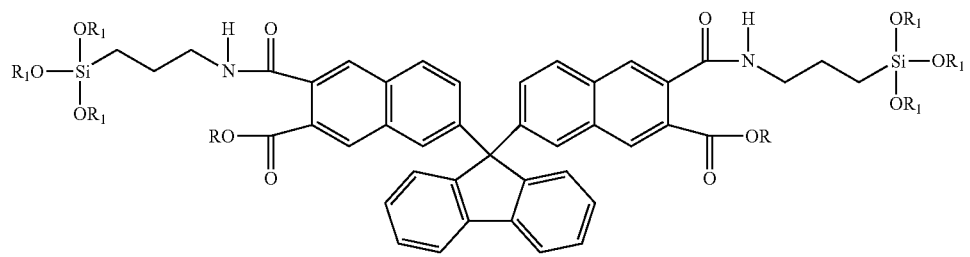
(3d)
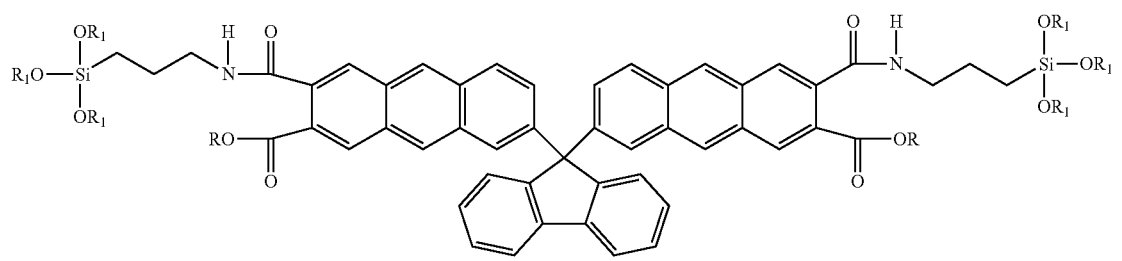
(3e)
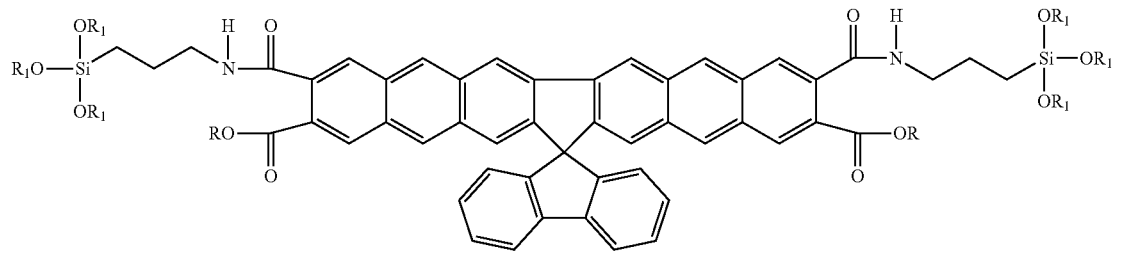
(3f)
In the above Formulas (3a) to (3f), $R_1$ and $R_2$ are the same as defined in Formula (1a).
According to one embodiment, the compound of Formula (1b) may be selected from compounds of the following Formulas (4a) to (4f).
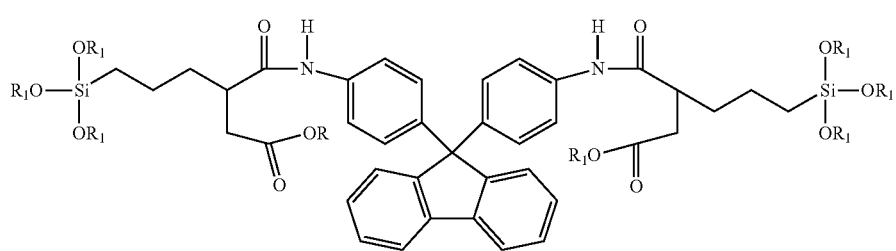
(4a)

-continued

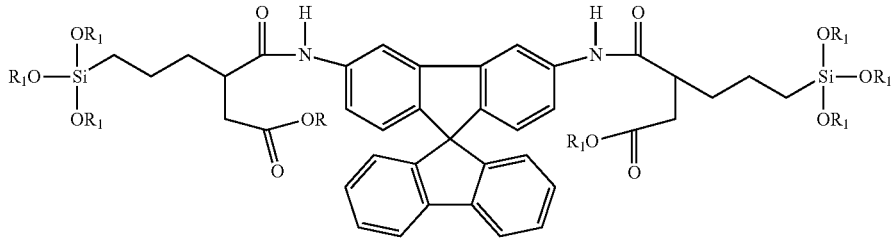
(4b)

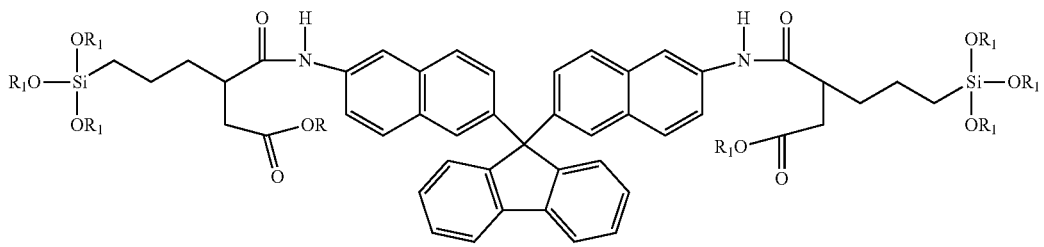
(4c)

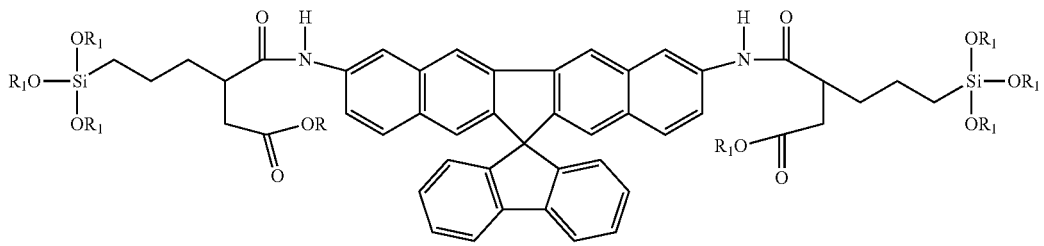
(4d)

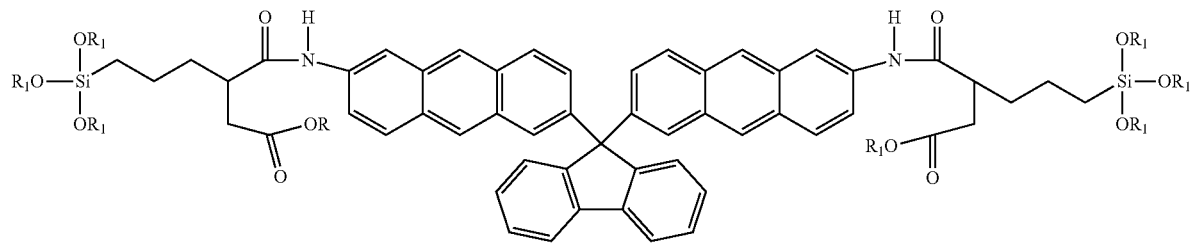
(4e)

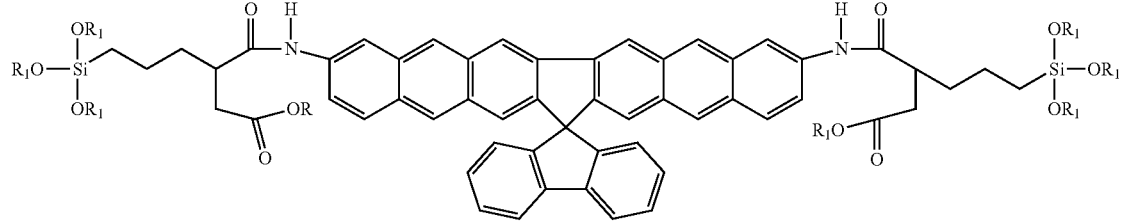
(4f)

In the above Formulas (4a) to (4f), $R_3$ and $R_4$ are the same as defined in Formula (1b).

The present invention provides a polyimide copolymer prepared by polymerizing and curing a polyimide precursor composition comprising:
- an acid dianhydride, a diamine and a dimethylsiloxane (DMS)-diphenylsiloxane (DPS) oligomer, as polymerization components;
- a solvent having a positive distribution coefficient (Log P); and
- a compound of Formula (1a) or (1b) as an adhesion promoter.

According to one embodiment, the domain of the DMS-DPS oligomer at a size of 50 nm or less is uniformly distributed in the polyimide matrix, and the volume occupied by the DMS-DPS domain may be 15 to 30% by volume of the total volume of the polymer matrix. The size of the DMS-DPS domain is preferably from 1 nm to 50 nm, or from 5 nm to 40, or from 10 nm to 30 nm, for uniform distribution.

According to one embodiment, the adhesion promoter may be contained in an amount of 0.001 to 0.5 mole per mole of the acid dianhydride.

In addition, the adhesion promoter may be contained in an amount of 0.1 to 10 parts by weight relative to 100 parts by weight of the polyimide precursor composition.

According to one embodiment, the adhesion promoter may be included in the polyimide precursor composition to form a structure of the following Formula (5a) or (5b).

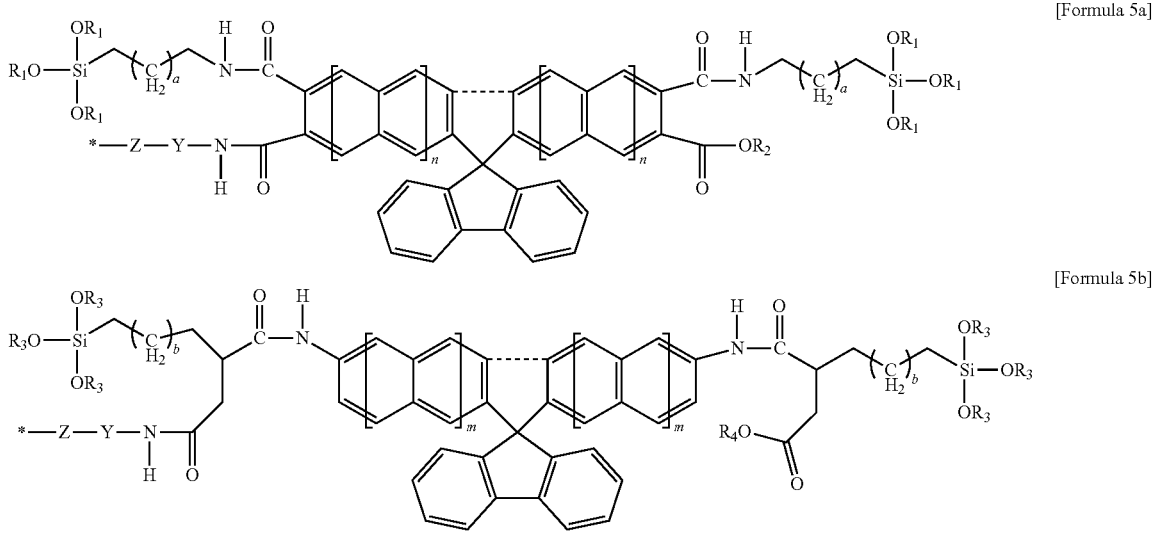

[Formula 5a]

[Formula 5b]

In the Formulas (5a) and (5b),
each of $R_1$, $R_2$, $R_3$, $R_4$, a, b, n and m is the same as defined in the Formulas (1a) and (1b),
Z is a residue derived from a tetracarboxylic dianhydride, and
Y is a residue derived from a diamine.

That is, the adhesion promoter according to one embodiment is bonded to the end of the repeating unit of the polyamic acid formed by the reaction of the tetracarboxylic dianhydride with the diamine as shown in the above Formula (5a) or (5b). Therefore, the amino group is not exposed and thus a salt is not generated from reaction with acid. And it is possible to provide a polyimide resin which has an increased adhesive strength and has no increase in the retardation in the thickness direction due to the fluorene structure.

According to one embodiment, the DMS-DPS oligomer may have a structure of the following Formula (6):

[Formula 6]

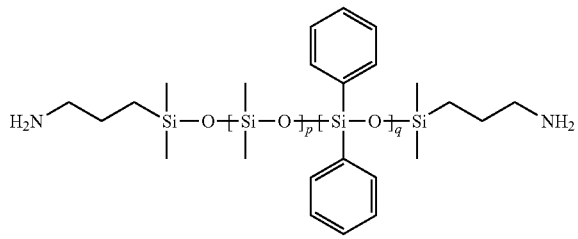

wherein, p and q are molar fractions, and when p+q=100, p is 70 to 90 and q is 10 to 30.

A molecular weight of the diamine compound having the structure of Formula (6) may be 4000 g/mol or more, preferably 4400 g/mol or more, and more preferably 5000 g/mol or more. Herein, the molecular weight means a weight average molecular weight, and can be determined by calculating amine equivalent using NMR analysis or acid-base titration.

When the molecular weight of the diamine having the structure of Formula (6) is less than 4000 g/mol, the heat resistance may be lowered. For example, when the glass transition temperature (Tg) of the resulting polyimide is decreased or the thermal expansion coefficient is excessively increased.

According to one embodiment, one or more diamines may be used in the present invention. The diamine of Formula (6) may be contained in an amount of 1 to 20 mol %, preferably 1 to 10 mol % of the total diamines.

According to one embodiment, the diamine of Formula (6) may be added in an amount of from 10 to 50% by weight, based on the total weight of the solid content of the polyimide precursor composition or the total weight of the polymerization components (diamine and acid dianhydride), preferably 10 to 40% by weight. If the diamine containing the structure of Formula (6) is added in an excess amount relative to the total weight of the solid content of polyimide precursor composition, for example, in an amount of 50 wt % or more, or 40 wt % or more, mechanical properties such as modulus of the polyimide may be decreased and the film strength may be reduced, so that physical damage such as tearing of the film in the process can occur. If the diamine having the structure of Formula (6) is added in excess, it has a glass transition temperature (Tg) which is derived from a polymer having the siloxane structure. From this, a glass state may be appeared at a low process temperature of 350° C. or lower. During deposition of inorganic film, due to the flow phenomenon of the polymer, wrinkles may be generated on the surface of the film, and the inorganic film may be cracked.

According to the present invention, the DMS-DPS domain distributed in the polyimide matrix has a continuous phase with a nano-size such as 1 nm to 50 nm, or 5 nm to 40 nm, or 10 nm to 30 nm, so that it is possible to minimize residual stress while maintaining heat resistance and mechanical properties. In the case of not having such a continuous phase, reduction effect of residual stress may be obtained, but heat resistance and mechanical properties are remarkably reduced and there is a difficulty in use in the process.

Herein, the DMS-DPS domain refers to the distribution region of the polymer having the DMS-DPS structure, and the size thereof refers to the diameter of the circle surrounding the region.

It is preferable that the portions (domains) including the DMS-DPS structure are connected in a continuous phase in the polyimide matrix, wherein the continuous phase means a shape in which nano-sized domains are uniformly distributed.

Accordingly, in the present invention, even though DMS-DPS has a high molecular weight, it can be uniformly distributed in the polyimide matrix without phase separation, resulting in a lowered haze characteristic and thus polyimide having more transparent characteristics. In addition, since the DMS-DPS structure is present in a continuous phase, mechanical strength and stress relaxation effect of the polyimide can be improved more efficiently. From these characteristics, the composition according to the present invention can provide a flat polyimide film having a reduced bending phenomenon of the substrate after coating and curing as well as thermal and optical properties.

By Introducing the structure of Formula (6) containing a siloxane structure into the polyimide structure, the present invention can improve the modulus strength of polyimide and alleviate the stress caused by external force. The polyimide including the siloxane structure may exhibit polarity. And phase separation may occur due to the difference in polarity from the polyimide structure that does not include the siloxane structure, thereby causing the siloxane structure to be unevenly distributed throughout the polyimide structure. In this case, it is difficult to exhibit improvement effect of physical properties such as the strength enhancement and stress relaxation effect of the polyimide owing to the siloxane structure, and the transparency of the film may be deteriorated due to an increase in haze resulted from phase separation. In particular, when a diamine containing a siloxane structure has a high molecular weight, the polyimide prepared from the diamine exhibits a more pronounced polarity, and the phenomenon of phase separation between polyimides may be more clearly appeared. However, when a siloxane diamine having a low molecular weight structure is used, a large amount of the siloxane diamine should be added in order to exhibit an effect such as stress relaxation. This may cause a process problem such as Tg at a low temperature, and thus the physical properties of the polyimide film may be deteriorated. Therefore, when a high molecular weight siloxane diamine is added, a relaxation segment can be largely formed in a molecule, and thus the stress relaxation effect can be effectively exhibited even with a lower amount as compared with the case where a low molecular weight siloxane diamine is added. Thus, the present inventors have studied a method for more uniformly distributing the diamine of Formula (6) having a high molecular weight siloxane structure on a polyimide matrix without phase separation.

The present invention can provide a polyimide film which is colorless and transparent and has excellent heat resistance, by producing polyimide by polymerizing in an organic solvent having a positive distribution coefficient (Log P) using a diamine containing a Si structure with a high molecular weight.

The solvent having a positive distribution coefficient (Log P) may be an amide-based solvent and the amide-based solvent may be at least one selected from the group consisting of dimethylpropionamide (DMPA), diethylpropionamide (DEPA), N,N-diethylacetamide (DEAc), N,N-diethylformamide (DEF), and N-ethylpyrrolidone (NEP).

The polyimide copolymer according to the present invention can reduce phase separation due to polarity difference between the flexible polyimide structure to which the structure of Formula (6) is introduced and other polyimide structure, by using the organic solvent as described above. Conventionally, two kinds of organic solvents have been used in order to solve the phase separation problem. However, the present invention can reduce white turbidity due to phase separation even with one kind of organic solvent, so that a more transparent polyimide film can be produced.

On the other hand, there is a method in which a polar solvent and a non-polar solvent are mixed to solve white turbidity problem. However, since a polar solvent has high volatility, it may be volatilized in advance during the production process, which may cause problems such as deterioration of process reproducibility. In addition, the problem of phase separation cannot be completely solved, resulting in high haze and low transparency of the produced polyimide film.

In the present invention, in order to uniformly distribute the polyimide structure containing the structure of Formula (6) in the overall polyimide matrix, a solvent having a positive distribution coefficient (Log P), particularly an amide-based solvent having a positive Log P is used. More specifically, by using a solvent containing an amphipathic molecular structure, it is possible to solve the process problem due to use of a polar solvent. Also, even if only one kind of solvent is used, due to the amphipathic molecular structure, the polyimide can be uniformly distributed and is suitable for solving the problem caused by phase separation. As a result, polyimide having significantly improved haze characteristics can be provided.

According to one embodiment, the dianhydride may be selected from tetracarboxylic dianhydrides containing a tetravalent organic group of the following Formulas (7a) to (7h) in the molecular structure.

[Formula 7a]
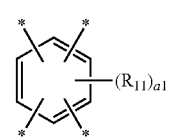

[Formula 7b]
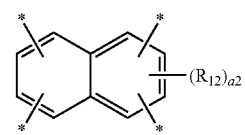

[Formula 7c]
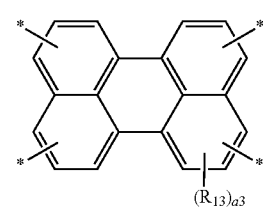

[Formula 7d]
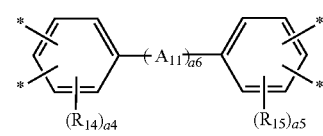

[Formula 7e]
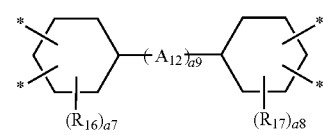

-continued

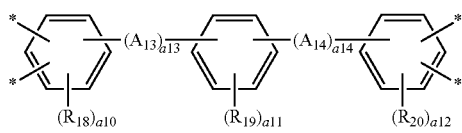
[Formula 7f]

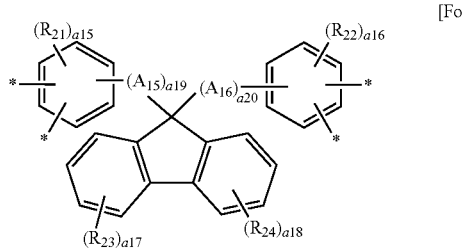
[Formula 7g]

[Formula 7h]

In the Formulas (7a) to (7h), $R_{11}$ to $R_{24}$ are each independently a substituent selected from a halogen atom selected from the group consisting of —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, a1 is an integer of 0 to 2, a2 is an integer of 0 to 4, a3 is an integer of 0 to 8, a4 and a5 are each independently an integer of 0 to 3, a7 and a8 are each independently an integer of 0 to 3, a10 and a12 are each independently an integer of 0 to 3, a11 is an integer of 0 to 4, a15 and a16 are each independently an integer of 0 to 4, a17 and a18 are each independently an integer of 0 to 4, and a6, a9, a13, a14, a19 and a20 are each independently an integer of 0 to 3, n is an integer of 1 to 3, and $A_{11}$ to $A_{16}$ are each independently selected from the group consisting of —O—, —CR'R"—, —C(=O)—, —C(=O)O—, —C(=O)NH—, —S—, —SO2-, a phenylene group and a combination thereof, wherein R' and R" are each independently selected from the group consisting of a hydrogen atom, an alkyl group having 1 to 10 carbon atoms and a fluoroalkyl group having 1 to 10 carbon atoms.

According to one embodiment, the diamine may include diamines containing a divalent organic group of the following Formula (8) in the molecular structure in an amount of 80 to 99 mol % based on the total diamine content.

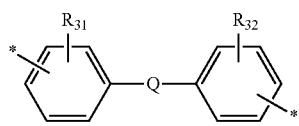
[Formula 8]

In the Formula (8), $R_{31}$ and $R_{32}$ are each independently a substituent selected from a halogen atom selected from the group consisting of —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, preferably a substituent selected from a halogen atom, a halogenoalkyl group, an alkyl group, an aryl group and a cyano group. For example, the halogen atom may be fluoro (—F), the halogenoalkyl group may be a fluoroalkyl group having 1 to 10 carbon atoms containing a fluoro atom, for example selected from a fluoromethyl group, a perfluoroethyl group and a trifluoromethyl group, the alkyl group may be selected from a methyl group, an ethyl group, a propyl group, an isopropyl group, a t-butyl group, a pentyl group and a hexyl group, and the aryl group may be selected from a phenyl group and a naphthalenyl group. More preferably, they may be substituted with a fluoro atom or a substituent containing a fluoro atom such as a fluoroalkyl group.

Q may be selected from a single bond, —O—, —CR'R"—, —C(=O)—, —C(=O)O—, —C(=O)NH—, —S—, —SO2-, a phenylene group and a combination thereof, wherein R' and R" are each independently selected from the group consisting of a hydrogen atom, an alkyl group having 1 to 10 carbon atoms and a fluoroalkyl group having 1 to 10 carbon atoms.

Herein, the "fluoro-based substituent" of the present invention means "a fluoro atom substituent" as well as "a substituent containing a fluoro atom".

The diamine of Formula (8) may be selected from compounds represented by the following Formulas (8a) to (8d).

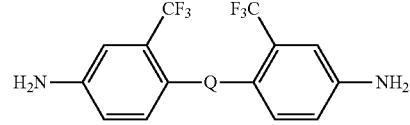
(8a)

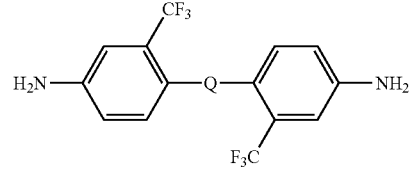
(8b)

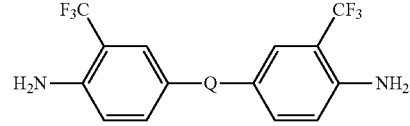
(8c)

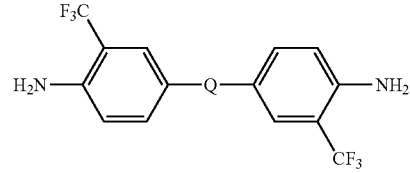
(8d)

In the Formulas (8a) to (8d), Q is the same as described above.

According to one embodiment, the tetracarboxylic dianhydride may contain a tetracarboxylic dianhydride having a structure represented by the following Formula (9) in an amount of 20 to 80 mol % in the total tetracarboxylic dianhydride, preferably 30 to 80 mol %, and more preferably 30 to 70 mol %.

[Formula 9]

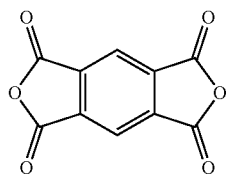

According to one embodiment, the tetracarboxylic dianhydride may contain a tetracarboxylic dianhydride having a structure represented by the following Formula (10) in an amount of 20 to 80 mol % in the total tetracarboxylic dianhydride, preferably 20 to 60 mol %, and more preferably 20 to 50 mol %.

[Formula 10]

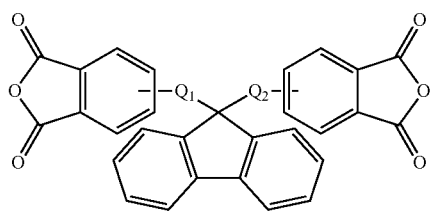

In the Formula (10), $Q_1$ and $Q_2$ are each independently selected from the group consisting of a single bond, —O—, —C(=O)—, —C(=O)O—, —C(=O)NH—, —S—, —SO2-, a phenylene group and a combination thereof.

According to one embodiment, the compound of Formula (10) may be compounds of following Formulas (10a) to (10e).

(10a)

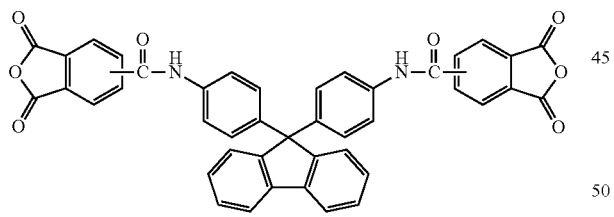

(10b)

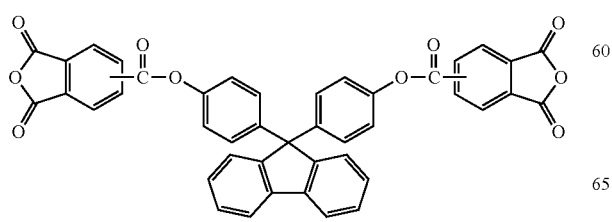

(10c)

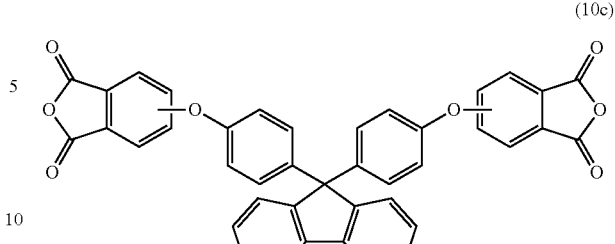

(10d)

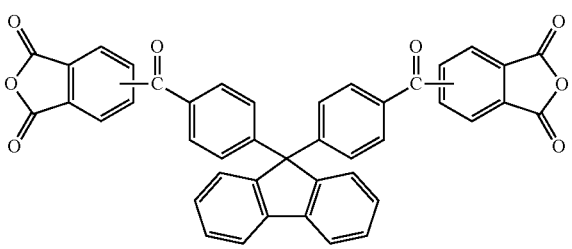

(10e)

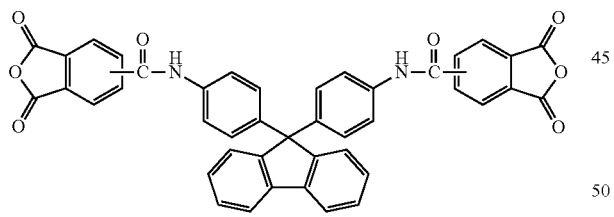

By including the fluorene structure in the polyimide structure, the retardation in the thickness direction of the film can be reduced.

In the present invention, at least one selected from the tetracarboxylic dianhydrides including the tetravalent organic group of the following Formulas (11a) to (11r) may be used together.

(11a)

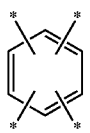

(11b)

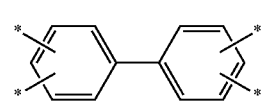

(11c)

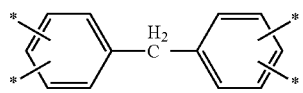

(11d)

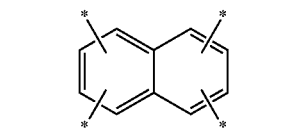

(11e)

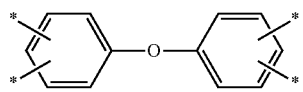

In the Formula (11l), A2 may be selected from the group consisting of a single bond, —O—, —C(=O)—, —C(=O)NH—, —S—, —SO2-, a phenylene group and a combination thereof, and v is an integer of 0 or 1, and in the Formula (11r), x is an integer of 1 to 10.

At least one hydrogen atom present in the tetravalent organic group of the Formulas (11a) to (11r) may be substituted with a substituent selected from a halogen atom selected from the group consisting of —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms.

Alternatively, in the present invention, the tetracarboxylic dianhydrides of the Formulas (9) and (10) may be used together. When the tetracarboxylic dianhydrides of the Formulas (9) and (10) are used together, the content of the tetracarboxylic dianhydride of the Formula (10) may be in the range of 10 to 30 mol %, preferably 10 to 25 mol %, more preferably 15 to 25 mol % with respect to the total content of the tetracarboxylic dianhydrides. By using the compound of the Formula (10) containing a fluorene structure together with the compound of the Formula (9) in the production of the polyimide, the shrinkage in the plane direction due to heat is alleviated. Thus, shrinkage phenomenon of the film generated during a cooling step after a heating step and heat resistance such as a glass transition temperature can be improved.

According to one embodiment of the present invention, the total content of the tetracarboxylic dianhydride and the content of the diamine may be in a molar ratio of 1:1.1 to 1.1:1. In order to improve reactivity and processability, it is preferred that the total content of the tetracarboxylic dianhydride is excessive relative to the diamine, or the content of the diamine is excessive relative to the total content of the tetracarboxylic dianhydride.

According to one embodiment of the present invention, it is preferable that the molar ratio of the total content of the tetracarboxylic dianhydride to the content of the diamine is 1:0.99 to 0.99:1, preferably 1:0.98 to 0.98:1.

The organic solvent that can be used in the polymerization reaction may have a positive distribution coefficient (Log P value) at 25° C. and a boiling point of 180° C. or less. More specifically, the partition coefficient, Log P value may be 0.01 to 3, or 0.01 to 2, or 0.1 to 2.

The distribution coefficient can be calculated using an ACD/Log P module of ACD/Percepta platform from ACD/Labs. The ACD/Log P module uses an algorithm based on QSPR (Quantitative Structure-Property Relationship) methodology using 2D molecular structures.

The positive distribution coefficient value means that the polarity of solvent is hydrophobic. According to the studies of the present inventors, if a specific solvent having a positive distribution coefficient (Log P) value is used to prepare a polyimide precursor composition, dewetting phenomenon of the solution can be improved. Further, by using a solvent having a positive Log P value, it is possible to control dewetting phenomenon of the solution without using additives for controlling a surface tension or a smoothness of the coating film, such as a leveling agent. Since an additional material such as an additive is not used, it is possible to eliminate problems of quality and process such as inclusion of a low-molecular substance in a final product, and to form a polyimide film having uniform properties more efficiently.

For example, in the process of coating a polyimide precursor composition on a glass substrate, dewetting of the solution may be occurred due to shrinkage of the coating layer during curing or leaving the coating solution under humidity condition. This dewetting phenomenon of the coating solution leads to a variation in the film thickness, resulting in insufficient bending resistance of the film. Therefore, film breakage may occur or edge cracking may appear when cutting. That is, there may be problems of poor processability and lowered yield.

If polar fine foreign substances are introduced to the substrate on which the polyimide precursor solution containing a polar solvent having a negative Log P is coated, the polarity of the foreign substances may cause sporadic coating cracks or thickness change around the portions where the foreign substances exist. On the contrary, when a hydrophobic solvent having a positive log P is used, coating cracks, thickness changes, or the like can be reduced or suppressed even when polar fine foreign substances are introduced.

Specifically, the polyimide precursor composition comprising a solvent having a positive Log P may have a dewetting ratio of 0% to 0.1% or less as defined by the following Equation (1):

$$\text{Dewetting ratio } (\%) = [(A-B)/A] \times 100 \quad [\text{Equation 1}]$$

In Equation 1,
A: area measured when the polyimide precursor composition is fully coated on a substrate (100 mm×100 mm),
B: area measured after dewetting phenomenon occurs from the end of edge of a substrate coated with polyimide precursor composition or PI film.

The dewetting phenomenon of the polyimide precursor composition and the film may occur within 30 minutes after coating the solution of the polyimide precursor composition. In particular, the edges are thickened as beginning of dewetting from edges.

After coating the substrate with the polyimide precursor composition according to the present invention and then leaving in a humidity condition for 10 minutes or more, for example, 10 minutes or more, for example, 40 minutes or more, the dewetting ratio is 0.1% or less. For example, even after leaving at a temperature of 20 to 30° C. and under a humidity condition of 40% or more, more specifically a humidity condition of 40% to 80%, that is, 40%, 50%, 60%, 70%, 80%, for example a humidity condition of 50% for 10 to 50 minutes, a very low dewetting ratio of 0.1% or less may be exhibited, preferably 0.05%, more preferably nearly 0%.

The above dewetting ratio is maintained even after curing. For example, after the polyimide precursor composition is coated on the substrate and then left for 10 minutes or more, for example, at a temperature of 20 to 30° C. and under a humidity condition of 40% or more, more specifically a humidity condition of 40% to 80%, that is, 40%, 50%, 60%, 70%, 80%, for example a humidity condition of 50% for 10 to 50 minutes, the dewetting ratio of the cured polyimide film may be 0.1% or less, that is, the dewetting can be hardly occurred or can be disappeared even in the curing process by heat treatment, and specifically 0.05%, more preferably nearly 0%.

The polyimide precursor composition according to the present invention can solve this dewetting phenomenon, thereby making it possible to obtain a polyimide film having more uniform characteristics and further improve the yield of the production process.

In addition, the density of the solvent according to the present invention can be 1 g/cm$^3$ or less as measured by standard ASTM D1475. If the density is more than 1 g/cm$^3$, the relative viscosity may be increased and the efficiency of the process may be reduced.

The reaction of tetracarboxylic dianhydride and diamine may be carried out by a conventional polymerization method of polyimide precursor, such as solution polymerization. Specifically, diamine is dissolved in an organic solvent and then is subjected to a polymerization reaction by adding tetracarboxylic dianhydride.

The polymerization reaction may be carried out in an inert gas or a nitrogen stream, and may be carried out under anhydrous conditions.

The reaction temperature during the polymerization reaction may be −20 to 80° C., preferably 0 to 80° C. If the reaction temperature is too high, the reactivity may become high and the molecular weight may become large, and the viscosity of the precursor composition may increase, which may be unfavorable in the process.

It is preferred that the polyimide precursor composition contains a solid content in an amount such that the composition has an appropriate viscosity in consideration of coating properties during a film-forming step, and the like. According to one embodiment, the content of the composition may be adjusted so that the total content of polyimide precursor is from 8 to 25% by weight, preferably from 10 to 25% by weight, more preferably from 10 to 20% by weight or less.

Alternatively, the polyimide precursor composition may be adjusted to have a viscosity of 3,000 cP or more, or 4,000 cP or more. The viscosity of the polyimide precursor composition is 10,000 cP or less, preferably 9,000 cP or less, more preferably 8,000 cP or less. When the viscosity of the polyimide precursor composition exceeds 10,000 cP, the efficiency of defoaming during processing the polyimide film is lowered. It results in not only the lowered efficiency of process but also the deteriorated surface roughness of the produced film due to bubble generation. It may lead to the deteriorated electrical, optical and mechanical properties.

The polyimide according to the present invention may have a weight average molecular weight of 10,000 to 200,000 g/mol, or 20,000 to 100,000 g/mol, or 30,000 to 100,000 g/mol. The molecular weight distribution (Mw/Mn) of the polyimide according to the present invention is preferably 1.1 to 2.5. When the weight average molecular weight or the molecular weight distribution of the polyimide is out of the above range, film formation may be difficult or the properties of polyimide film such as transmittance, heat resistance and mechanical properties may be deteriorated.

Then, the obtained polyimide precursor as a result of the polymerization reaction may be imidized to prepare a transparent polyimide film. At this time, the imidization process may be specifically a chemical imidization or thermal imidization process.

For example, after adding a dehydrating agent and an imidization catalyst to a polymerized polyimide precursor composition, the polymerized polyimide precursor composition is heated at a temperature of 50 to 100° C. and imidized by a chemical reaction, or the solution is refluxed to remove an alcohol and imidized to obtain polyimide.

In the chemical imidization method, pyridine, triethylamine, picoline or quinoline may be used as an imidization catalyst. In addition, a substituted or unsubstituted nitrogen-containing heterocyclic compound, an N-oxide compound of the nitrogen-containing heterocyclic compound, a substituted or unsubstituted amino acid compound, an aromatic hydrocarbon compound having a hydroxyl group or an aromatic heterocyclic compound, and particularly, lower alkylimidazole such as 1,2-dimethylimidazole, N-methylimidazole, N-benzyl-2-methylimidazole, 2-methylimidazole, 2-ethyl-4-methylimidazole and 5-methylbenzimidazole, isoquinoline, substituted pyridine such as, 3,5-dimethylpyridine, 3,4-dimethylpyridine, 2,5-dimethylpyridine, 2,4-dimethylpyridine and 4-n-propylpyridine, and p-toluenesulfonic acid, may be used.

As the dehydrating agent, an acid dianhydride such as acetic anhydride may be used.

Alternatively, the polyimide precursor composition may be coated on a substrate and heat treated to be imidized.

The polyimide precursor composition may be in the form of a solution in which the polyimide precursor is dissolved in an organic solvent. For example, when the polyimide precursor is synthesized in an organic solvent, the solution may be the reaction solution as obtained, or may be obtained by diluting this reaction solution with another solvent. When the polyimide precursor is obtained as a solid powder, it may be dissolved in an organic solvent to prepare a solution.

A method for producing a film with a polyimide precursor solution according to the present invention comprises the steps of:
  applying the polyimide precursor solution onto a substrate; and
  heat treating the applied polyimide precursor solution.

As the substrate, a glass substrate, a metal substrate, a plastic substrate, or the like can be used without any particular limitation. Among them, a glass substrate may be preferable which is excellent in thermal and chemical stability during the imidization and curing process for the polyimide precursor and can be easily separated even without any treatment with additional release agent while not damaging the formed polyimide film after curing.

The applying step may be carried out according to a conventional application method. Specifically, a spin coating method, a bar coating method, a roll coating method, an air knife method, a gravure method, a reverse roll method, a kiss roll method, a doctor blade method, a spray method, a dipping method, a brushing method, or the like may be used. Of these, it is preferable to carry out by a casting method which allow a continuous process and enables to increase an imidization rate of polyimide.

In addition, the polyimide precursor composition may be applied on the substrate in the thickness range such that the polyimide film to be finally produced has a thickness suitable for a display substrate.

Specifically, it may be applied in an amount such that the thickness is 10 to 30 μm. After the application of the polyimide precursor composition, a drying process for removing the solvent remained in the polyimide precursor composition may be further optionally performed prior to the curing process.

The drying process may be carried out according to a conventional method. Specifically, the drying process may be carried out at a temperature of 140° C. or lower, or from 80° C. to 140° C. If the drying temperature is lower than 80° C., the drying process becomes longer. If the drying temperature exceeds 140° C., the imidization proceeds rapidly, making it difficult to form a polyimide film having a uniform thickness.

Then, the polyimide precursor composition is applied on a substrate and heat-treated in an IR oven, in a hot air oven, or on a hot plate. The heat treatment temperature may range from 300 to 500° C., preferably from 320 to 480° C. The heat treatment may be performed in a multi-step heating process within the above temperature range. The heat treatment process may be performed for 20 to 70 minutes, and preferably for 20 to 60 minutes.

Thereafter, the polyimide film formed on the substrate may be peeled off from the substrate according to a conventional method, resulting in a polyimide film.

The organic solvent contained in the polyimide precursor composition of the present invention may be the same as the organic solvent used in the polymerization reaction.

In the present invention, a silane coupling agent, a crosslinkable compound, an imidization accelerator for promoting imidization efficiently, and the like may be added as long as the effect is not impaired.

In addition, the polyimide-based film may have a haze of 2 or less, preferably 1 or less, or 0.9 or less, thereby providing a polyimide film with improved transparency. At this time, the thickness of the polyimide film may be 8 to 15 μm, preferably 10 to 12 μm.

Also, it may be a transparent colorless polyimide film having a transmittance to light at a wavelength of 380 to 760 nm of 80% or more and a yellowness index (YI) of about 15 or less, preferably about 10 or less, more preferably about 8 or less. By having excellent light transmittance and yellowness as described above, it is possible to exhibit significantly improved transparency and optical characteristics.

The polyimide film according to the present invention may have a glass transition temperature (Tg) of 350° C. or higher, preferably 360° C. or higher, and more preferably 370° C. or higher.

The polyimide film according to the present invention may have excellent thermal stability depending on a temperature change. For example, it may have a thermal expansion coefficient of −10 to 100 ppm/° C., preferably from −7 to 90 ppm/° C., more preferably 80 ppm/° C. or less, after the n+1 times heating and cooling processes in a temperature range of 100 to 400° C.

In addition, the compound of Formula (1a) or (1b) according to the present invention may provide a reduced retardation value of the film while maintaining the characteristics of the polyimide film by introducing a fluorene structure into its structure. For example, the polyimide film which contains the above compound as an adhesion promoter may have an in-plane retardation (Rin) of about 0 to 100 nm, a retardation value (Rth) in the thickness direction of about −1000 to 1000 nm, or −700 to 700 nm, preferably −600 to 600 nm, more preferably −500 to 500 nm or −200 to 200 nm. It is possible to exhibit visibility suitable for display in the range of the retardation in the thickness direction. When the retardation in the thickness direction is 1000 nm or −1000 nm or more, a phase difference is generated in the polyimide film and the light is distorted, so that the visibility may be remarkably lowered.

According to one embodiment, the polyimide film including the adhesion promoter may have adhesive force to the carrier substrate of at least 5 gf/in, and preferably at least 10 gf/in.

The present invention provides a novel compound useful as an adhesion promoter for a polyimide resin to provide a novel polyimide film which is excellent in adhesion to a carrier substrate even in a high temperature process while maintaining the existing properties such as high transparency, heat resistance, mechanical properties and low residual stress.

In another embodiment of the present invention, there is provided a molded article comprising the polyimide copolymer.

The polyimide copolymer according to the present invention can be used for a protective film for a circuit substrate, a base film for a circuit substrate, an insulating layer for a circuit substrate, an interlayer insulating film for a semiconductor, a solder resist, a flexible circuit substrate or a flexible display substrate. In particular, it is suitable for an OLED device using a low temperature polysilicon (LTPS) which requires a high temperature process, but is not limited thereto.

Hereinafter, embodiments of the present invention will be described in detail so that those skilled in the art can easily carry out the present invention. The present invention may, however, be embodied in many different forms and should not be construed as limited to the embodiments set forth herein.

Synthesis Example 1

A compound having the structure of Formula (20) was produced via a reaction scheme (1).

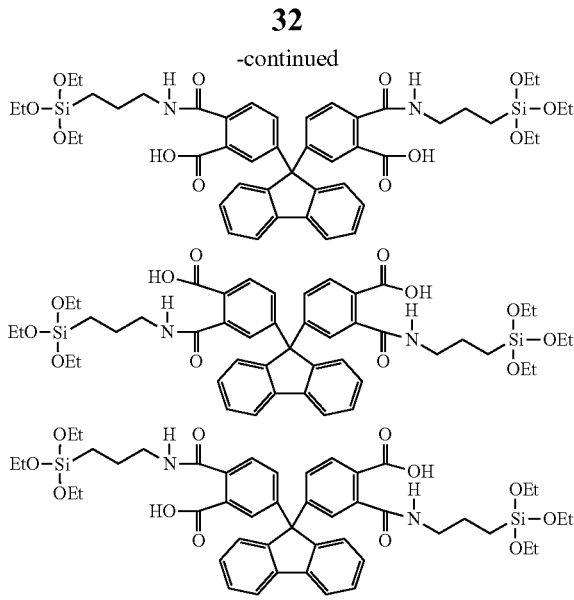

[Formula 20]

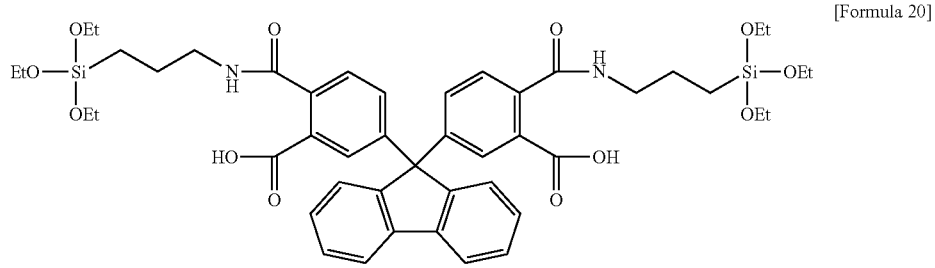 [SMILES: CCO[Si](CCCNC(=O)c1ccc(C2(c3ccc(C(=O)NCCC[Si](OCC)(OCC)OCC)c(C(=O)O)c3)c3ccccc3-c3ccccc32)cc1C(=O)O)(OCC)OCC]

More specifically, 1463 g of DEAc (diethylacetamide) was charged into a reactor through which nitrogen gas flows, and then 0.916 mol of one-end amine-modified APTES (3-Aminopropyltriethoxysilane) was added and dissolved while the temperature of the reactor was maintained at 25° C. At the same temperature, 0.458 mol of BPAF (9,9'-bis (3,4-dicarboxyphenyl)fluorene dianhydride) was added to the solution to which APTES was added, and stirred for 24 hours. 1H-NMR of the synthesized compound is shown in FIGS. 1 and 2. FIG. 3 shows the 1H-NMR peaks of the compound of Formula (20) and APTES in comparison.

<NMR Measurement Method>

Using an insert tube filled with acetone-d6, NMR spectrum of the undiluted solution was measured with Bruker 700 MHz NMR.

As can be seen from the measurement results of 1H NMR spectra in FIGS. 1 to 3, in which the (CO)NCH2 peak generated by the reaction of APTES monomer with BPAF is appeared at around 3.4 ppm, it was found that the synthesis reaction proceeded.

Synthesis Example 2

Synthesis was carried out according to Reaction Scheme 2 in the same manner as in Synthesis Example 1, except for using BPDA (3,3',4,4'-biphenyltetracarboxylic dianhydride) instead of BPAF.

[Reaction scheme 1]

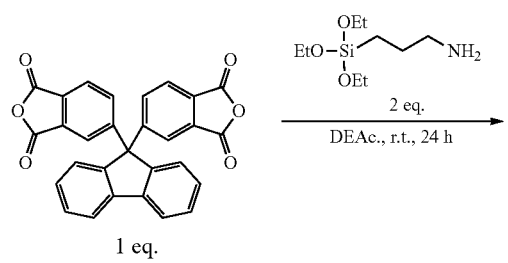

[Reaction Scheme 2]

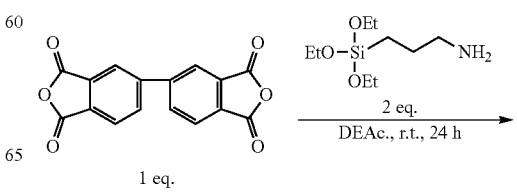

-continued

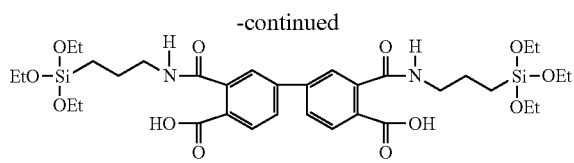

Polymerization Example 1

124 g of N,N-diethylacetamide (DEAc) (distribution coefficient: 0.32) was charged into a reactor through which nitrogen gas flows, and then 0.0010 mol of both-end amine-modified DMS-DPS (molecular weight: 5700 g/mol, p=73.3, q=26.7) and 0.0390 mol of TFMB (2,2'-bis(trifluoromethyl)benzidine) are added and dissolved while the temperature of the reactor was maintained at 25° C. At the same temperature, 0.032 mol of PMDA and 0.008 mol of BPAF (9,9'-bis(3,4-dicarboxyphenyl)fluorene dianhydride) were added to the solution to which DMS-DPS and TFMB were added, and stirred for 3 hours, and then stirred at 80° C. for 4 hours.

The structure of DMS-DPS is as follows:

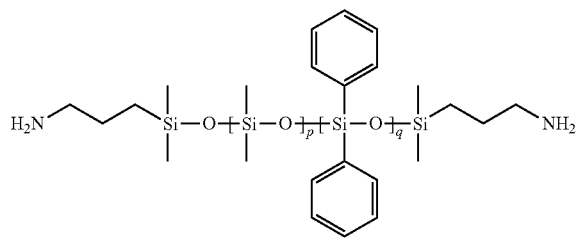

wherein, p and q are molar fractions, and when p+q=100, p is 70 to 90 and q is 10 to 30.

Example 1

To the polyimide precursor solution prepared in Polymerization Example 1, 0.5 part by weight of the compound obtained in Synthesis Example 1 was added based on 100 parts by weight of polyamic acid.

Comparative Example 1

To the polyimide precursor solution prepared in Polymerization Example 1, 0.5 part by weight of the compound obtained in Synthesis Example 2 was added based on 100 parts by weight of polyamic acid.

Experimental Example

Each of the polyimide precursor solutions prepared in Example 1 and Comparative Example 1 was spin-coated on a glass substrate. The glass substrate coated with the polyimide precursor solution was placed in an oven, heated at a rate of 5° C./min, and cured at 80° C. for 30 minutes and at 400° C. for 30 minutes to prepare a polyimide film.

YI, Rth and Tg of the polyimide film were measured and the results are shown in Table 1 below.

<Yellowness Index (YI)>

Yellowness index (YI) was measured with Color Eye 7000A.

<Retardation in the Thickness Direction>

Retardation in the thickness direction (Rth) was measured with Axoscan. The film was cut to a certain size and the thickness was measured. Then, a retardation value was measured with Axoscan. To compensate the retardation value, the thickness (nm) measured while being corrected in the C-plate direction was input to Axoscan.

<Glass Transition Temperature (Tg)>

The film was cut to 5×20 mm to prepare a sample, and then the sample was loaded using an accessory. A length of the film to be actually measured was equal to 16 mm. A pulling force was set at 0.02 N. The first temperature-rising step was carried out at a heating rate of 5° C./min from 100 to 400° C., then cooling was carried out at a cooling rate of 4° C./min from 400 to 100° C., and the second temperature-rising step was carried out at a heating rate of 5° C./min from 100 to 450° C. The change in the thermal expansion was measured with TMA (Q400, TA Company).

At this time, the inflection point shown in the temperature-rising section during the second temperature-rising step was defined as Tg.

<Peeling Strength>

The peeling strength (adhesive force) of the polyimide film prepared as described above was measured by 90° peeling the sample having a film width of 2.54 cm and a measurement length of 10 mm at 10 mm/sec, using a peeling strength analyzer (TA-XT Plus, Texture Analyzer).

TABLE 1

| | Example 1 | Comparative Example 1 |
|---|---|---|
| DMS-DPS Mw | 5700 | 5700 |
| Organic solvent | DEAc | DEAc |
| DMS-DPS content (wt %) | 20 | 20 |
| PI molecular weight | 59400 | 59400 |
| Solid content (wt %) | 17.3 | 17.3 |
| Novel adhesion promoter content (wt %) | 0.5 | 0.5 |
| Viscosity (cP) | 4800 | 4700 |
| Thickness(μm) | 10.1 | 10.1 |
| YI | 5.8 | 5.8 |
| Rth (nm) | 480 | 550 |
| Tg (° C.) | ND | ND |
| Peeling strength (gf/in) | 20 | 20 |

As can be seen from the results of Table 1, it was found that the polyimide film of Example 1 including the adhesion promoter according to the present invention maintains Rth at a low level while maintaining high peeling strength, but in the case of Comparative Example 1, Rth was increased.

Accordingly, it can be seen that the adhesive promoter for a polyimide resin according to the present invention can provide a polyimide having improved adhesive force and high heat resistance.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A compound comprising a structure of Formula (2a) or (2b):

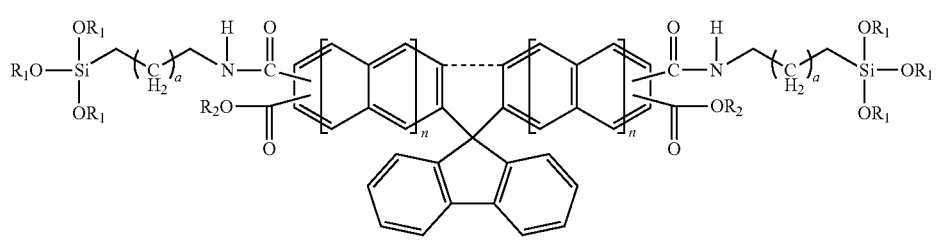
[Formula 2a]

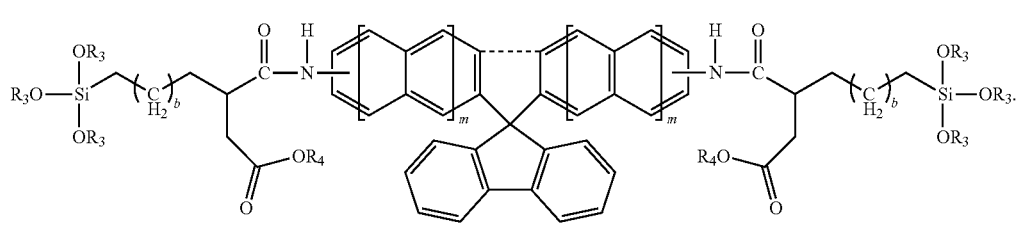
[Formula 2b]

in the Formulas (2a) and (2b),
$R_1$ and $R_3$ are each independently an alkyl group having 1 to 5 carbon atoms,
$R_2$ and $R_4$ are each independently a hydrogen atom or an alkyl group having 1 to 5 carbon atoms,
a and b are each independently an integer of 1 to 3,
n and m are each independently an integer of 0 to 3, and
a dotted line (- - - - - -) indicates a bond or a non-bond.

2. The compound according to claim 1, wherein the compound of Formula 2a is at least one compound selected from the group of compounds of the following Formulae (3a) to (3f):

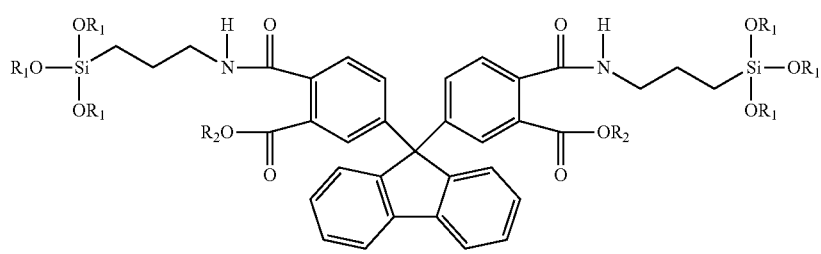
(3a)

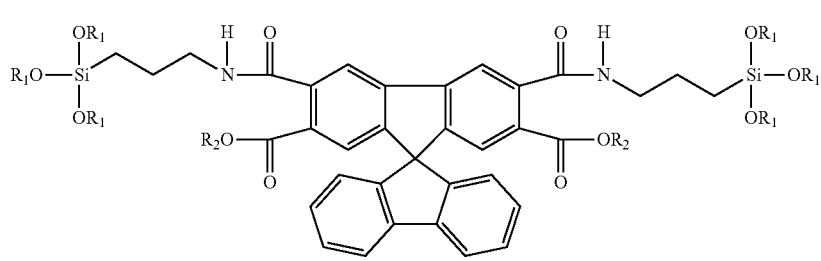
(3b)

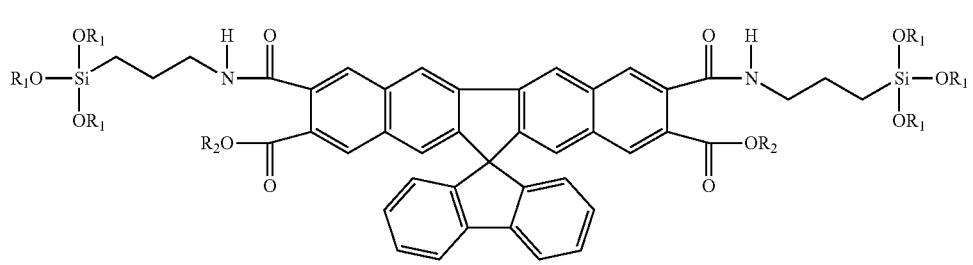
(3c)

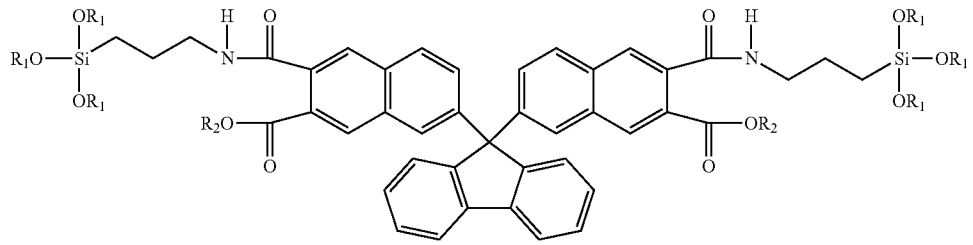
(3d)
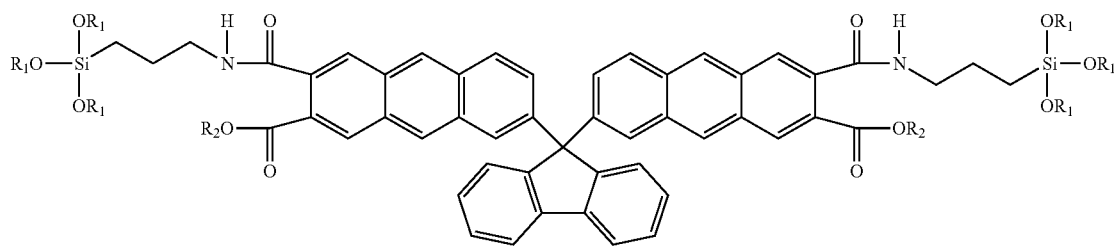
(3e)
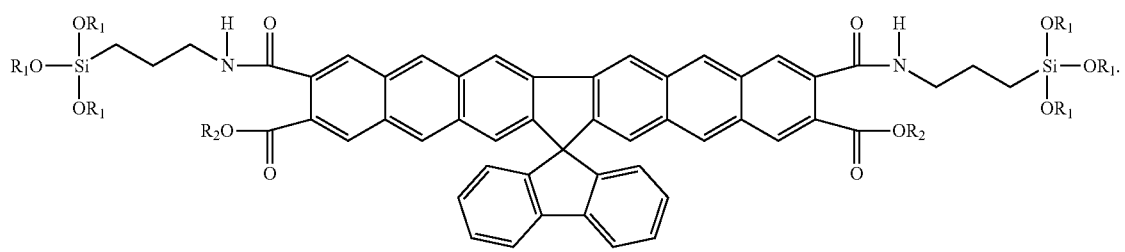
(3f)
3. The compound according to claim 1, wherein the compound of Formula 2b is at least one compound selected from the group of compounds of the following Formulae (4a) to (4f):
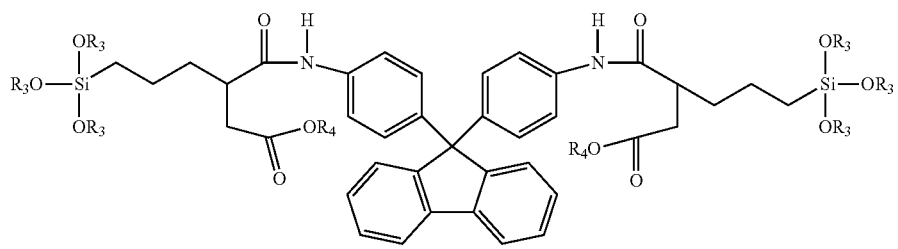
(4a)
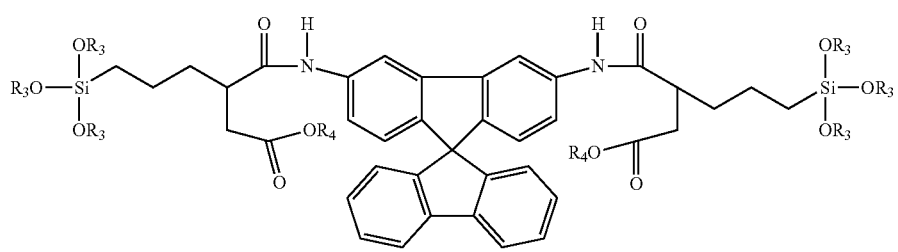
(4b)

-continued

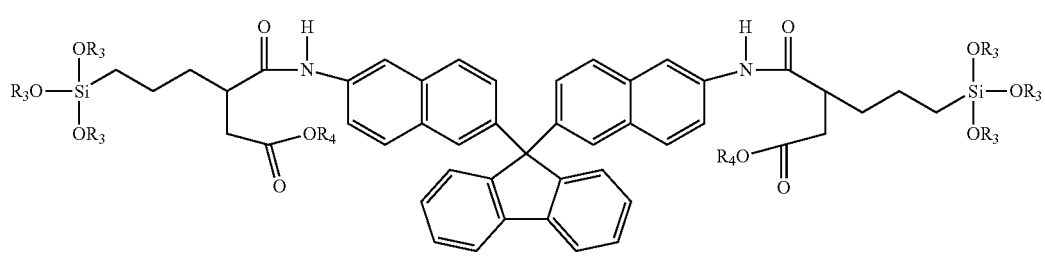

(4c)

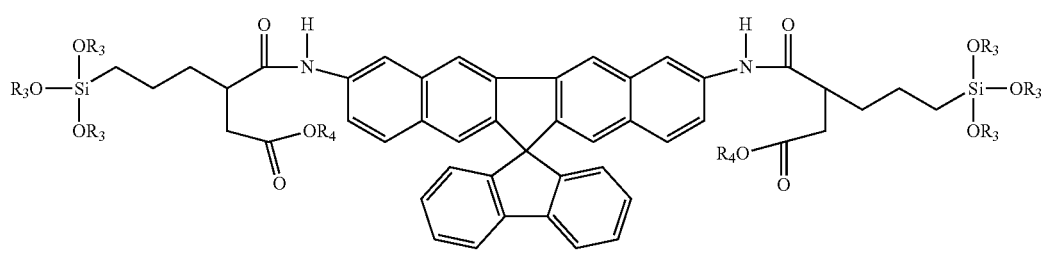

(4d)

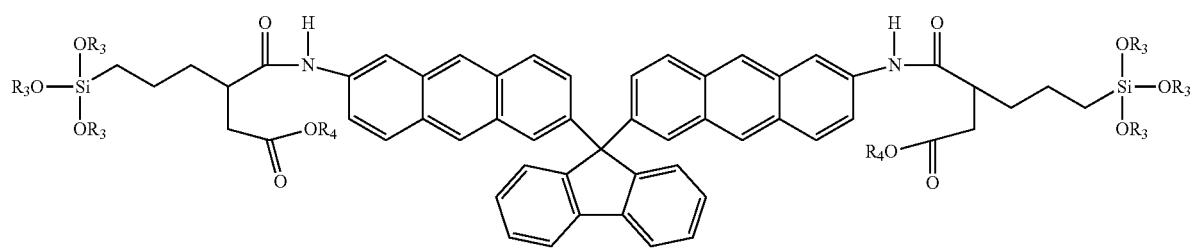

(4e)

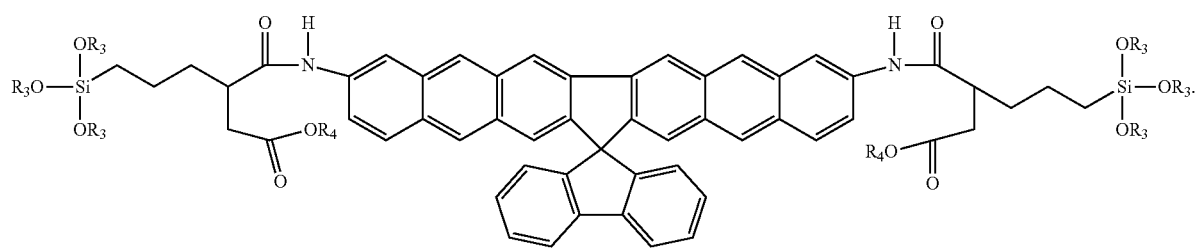

(4f)

4. A polyimide copolymer comprising a polymerized and cured product of a polyimide precursor composition comprising:
- an acid dianhydride, a diamine and a dimethylsiloxane (DMS)-diphenylsiloxane (DPS) oligomer, as polymerization components;
- a solvent having a positive distribution coefficient (Log P) at 25° C.; and
- the compound of claim 1.

5. The polyimide copolymer according to claim 4, wherein the dimethylsiloxane-diphenylsiloxane oligomer has a structure of Formula (6):

[Formula 6]

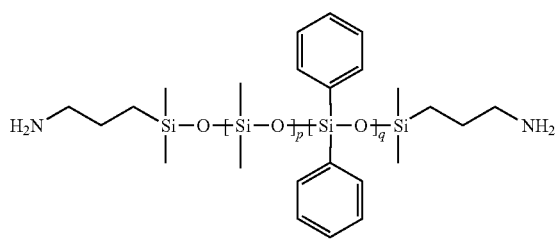

wherein, p and q are molar fractions, and when p+q=100, p is 70 to 90 and q is 10 to 30.

6. The polyimide copolymer according to claim 4, wherein the compound according to claim 2 is contained in an amount of 0.1 to 10 parts by weight based on 100 parts by weight of the polyimide precursor composition.

7. The polyimide copolymer according to claim 4, wherein the compound according to claim 2 is contained in an amount of 0.001 to 0.5 mole per mole of the acid dianhydride.

8. The polyimide copolymer according to claim 5, wherein the weight average molecular weight of the dimethylsiloxane-diphenylsiloxane oligomer having the structure of Formula (6) is 4000 g/mol or more.

9. The polyimide copolymer according to claim 4, wherein the solvent having a positive distribution coefficient (Log P) at 25° C. is an amide-based solvent.

10. The polyimide copolymer according to claim 9, wherein the amide-based solvent is at least one selected from the group consisting of dimethylpropionamide (DMPA), diethylpropionamide (DEPA), N,N-diethylacetamide (DEAc), N,N-diethylformamide (DEF) and N-ethylpyrrolidone (NEP).

11. A polyimide film comprising the polyimide copolymer according to claim 4.

12. The polyimide film according to claim 11, wherein the retardation of the polyimide film is −500 to 500 nm.

13. The polyimide film according to claim 11, wherein the adhesive force between the polyimide film and a carrier substrate is at least 5 gf/in measured as a peeling strength using a peeling strength analyzer.

\* \* \* \* \*